US012802564B2

(12) United States Patent
Ealey

(10) Patent No.: US 12,802,564 B2
(45) Date of Patent: Nov. 17, 2026

(54) CONFIGURABLE LIGHTS FOR TRAFFIC CONTROL SYSTEM

(71) Applicant: FLEX TRAFFIC SYSTEMS, LLC, Mesa, CO (US)

(72) Inventor: Jennifer Ealey, Collbran, CO (US)

(73) Assignee: Flex Traffic Systems, LLC, Collbran, CO (US)

( * ) Notice: Subject to any disclaimer, the term of this patent is extended or adjusted under 35 U.S.C. 154(b) by 0 days.

(21) Appl. No.: 19/182,908

(22) Filed: Apr. 18, 2025

(65) Prior Publication Data

US 2025/0246073 A1 Jul. 31, 2025

Related U.S. Application Data

(63) Continuation-in-part of application No. 18/982,544, filed on Dec. 16, 2024, which is a continuation-in-part of application No. 18/057,275, filed on Nov. 21, 2022, now Pat. No. 12,300,104.

(60) Provisional application No. 63/264,455, filed on Nov. 23, 2021.

(51) Int. Cl.
*G08G 1/095* (2006.01)
*G08G 1/07* (2006.01)

(52) U.S. Cl.
CPC ............... *G08G 1/095* (2013.01); *G08G 1/07* (2013.01)

(58) Field of Classification Search
None
See application file for complete search history.

(56) References Cited

U.S. PATENT DOCUMENTS 4,214,168 A * 7/1980 Kulka ...................... B60Q 1/30 362/540
12,300,104 B2 5/2025 Ealey
2006/0257205 A1 11/2006 Jordan
2009/0267794 A1 10/2009 Chang
2009/0284393 A1 11/2009 Ochiai
2014/0197955 A1* 7/2014 Martin .................... E01C 17/00 340/584
2016/0230784 A1 8/2016 Shani
2018/0253964 A1 9/2018 Wong
2018/0281665 A1 10/2018 Stelzl
2020/0263858 A1* 8/2020 Mallory .................. F21V 5/048
2022/0262243 A1 8/2022 Trim
2023/0162600 A1 5/2023 Ealey
2025/0118200 A1 4/2025 Ealey

* cited by examiner

*Primary Examiner* — John F Mortell

(74) *Attorney, Agent, or Firm* — Trenner Law Firm, LLC; Mark Trenner

(57) ABSTRACT

A traffic signaling device is disclosed. In an example, the traffic signaling device includes a light panel with a plurality of LED lights arranged to emit light. The example traffic signaling device also includes a base for housing the light panel. The example traffic signaling device also includes a diffuser cover having a predetermined shutter pattern configured to selectively block and allow passage of light emitted by the light panel to form visible lighted signal shapes. The diffuser cover can be modular and interchangeable with other diffuser covers, allowing different light patterns to be displayed by removing one diffuser cover and replacing it with another diffuser cover with a different light pattern.

16 Claims, 23 Drawing Sheets

700c

CONFIGURABLE LIGHTS FOR TRAFFIC CONTROL SYSTEM

CROSS-REFERENCE TO RELATED APPLICATIONS

This application is a continuation in part (CIP) of U.S. patent application Ser. No. 18/982,544 filed Dec. 16, 2024 for "Lighted Traffic Control Device" of Jennifer Ealey, which is a continuation in part (CIP) of U.S. patent application Ser. No. 18/057,275 filed Nov. 21, 2022 for "Lighted Traffic Control Device" of Jennifer Ealey, which claims the priority filing benefit of U.S. Provisional Patent Application No. 63/264,455 filed Nov. 23, 2021 for "Lighted Traffic Control Device" of Jennifer Ealey, each hereby incorporated by reference in its entirety as though fully set forth herein.

BACKGROUND

Work zones on highways and roadways are extremely dangerous for the work crews. Even with extensive signage and road barriers, workers are killed in work zones every year. Often, drivers will say that road signage "disappears" (or blends into the background) because of the numerous clutter of signs (both road signs and commercial signs) already seen daily by motorists alongside the roadway. As such, many drivers do not even notice work zone signage on the side of the road when entering a work zone.

DETAILED DESCRIPTION

Figure 1:
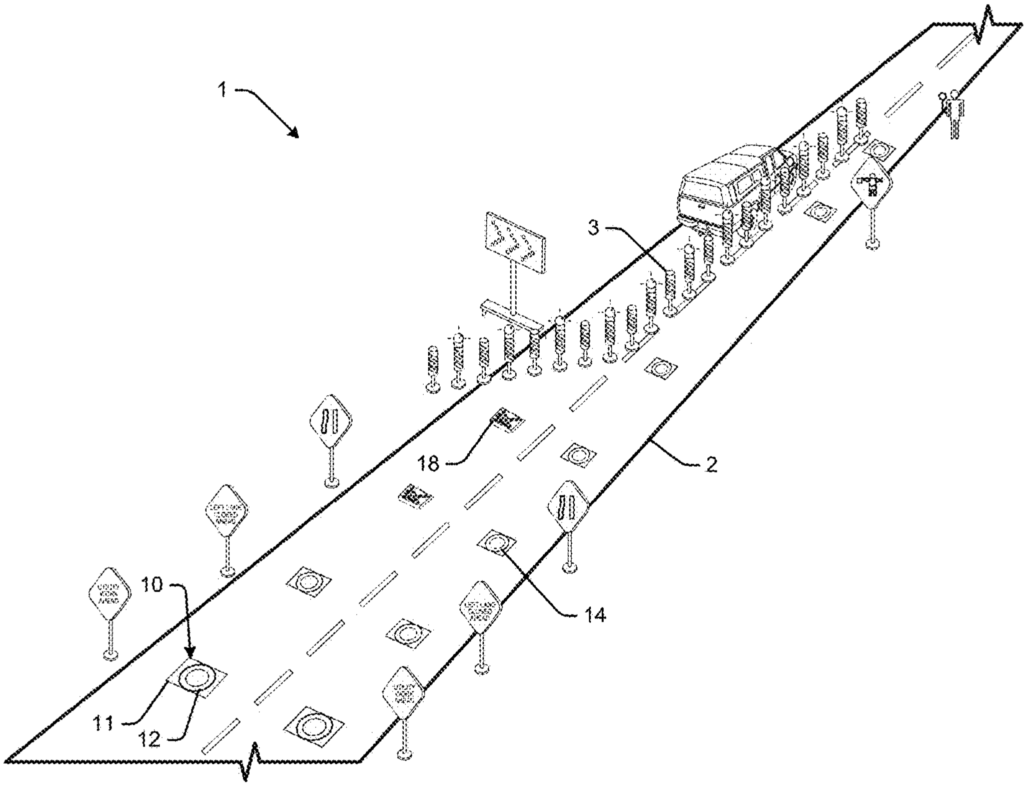
FIG. 1 illustrates an implementation of example lighted traffic control devices configured to provide drivers with warnings in a work zone that is partially closed for road repair.

A traffic signaling device is disclosed as a lighted traffic control device with configurable lights that produce a pattern. In an example, the traffic signaling device includes a light panel with a plurality of LED lights arranged to emit light. The example traffic signaling device also includes a base for housing the light panel. The example traffic signaling device also includes a cover for the base. The cover includes a predetermined shutter pattern configured to selectively block and allow passage of light emitted by the light panel to form visible lighted signal shapes. The cover can be modular and interchangeable, allowing different light patterns to be displayed by removing one cover and replacing it with another cover with a different light pattern.

The lighted traffic control device can be utilized in work zones as a temporary traffic control device for use on roadways. An example lighted traffic control device may be implemented as a signal mat (or simply a "mat") configured for placement on a road surface to bring attention to approaching lane closures and other work zone strategies with lighting. Multiple signal mats may be provided in communication individually or in combination with other signal mats (e.g., as a network) that can be set up, configured, monitored, and controlled remotely (e.g., via a mobile device app) to provide a coordinated traffic management strategy for vehicles, trucks, pedestrians, cyclists, etc. for work zones, roadways, pathways, special events, etc.

In an example, the lighted traffic control device includes an independent power source integral with the mat. The example lighted traffic control device also includes an LED lighting circuit having a plurality of LED lights inset into the mat in a configuration corresponding to a road sign. The road sign may be permanently embedded in the mat, or configurable, e.g., by turning LED lights on/off according to a pattern. The example lighted traffic control device also includes a control circuit integral with the mat to operate the LED lighting circuit according to a road or lane closure plan.

The example lighted traffic control device may include universally known traffic control colors such as those used by nearly every country throughout the world. This makes the lighted traffic control device recognizable by nearly all drivers globally. The example lighted traffic control device can help to decrease the number of accidents and fatalities due to distracted or drowsy drivers, by "grabbing" the drivers attention where the driver is most likely to be looking—at the road ahead.

A traffic control system is also disclosed as it may include multiple lighted traffic control devices or signal mats. The signal mats may be deployed on a surface on or near a road or pathway for various traffic control situations. An example system includes a plurality of signal mats each having a lighting circuit with a plurality of lights that can be configured, actuated/deactivated in coordination with one another according to a traffic control plan for a traffic control situation. The signal mat can be used for permanent or temporary applications.

In an example, the signal mats can be driven on or over, and provide a traffic control device for the use on roadways to better bring attention to approaching lane closures, lane shifts, detours, and other work zone and traffic control strategies. The signal mats are designed to operate with universally known colors that are used for traffic control in most every country, making the signals recognizable by drivers globally. Use of the signal mats can decrease the number of accidents and fatalities due to distracted or drowsy drivers by "grabbing" the attention of drivers. That is, the output from the signal mats does not "disappear" into the cluttered signage already being seen by motorists alongside the roadway. For example, some extensive work zone setups have a lot of construction orange, which can be overwhelming to motorists, blending everything together and "fading" into the background. The use of the signal mats disclosed herein helps the signage stand out and be easily recognized.

In an example, the signal mats have a no-slip design for engaging with the roadway or other surface. The signal mats may, in addition or instead of, have the ability to be temporarily adhered to the surface (e.g., the pavement) by the use of mechanical fasteners and/or adhesive pads.

The flexibility of the mat helps to ensure functionality in a variety of different applications and roadway surfaces, including those that vary in pitch, where rigid materials would otherwise fail to conform to the surface that the signal mats are placed on.

It is noted that motorists are statistically more likely to straddle an object in the roadway rather than run it over. With that in mind, the signal mat can have a width of about 3 to 4 feet to be readily straddled by vehicles and trucks. Of course, the signal mats do not need to be any particular size, and can be larger or smaller based on application. In addition, the signal mat can be of sturdy construction to be driven over by vehicles and trucks. Embedding the components below the top surface of the signal mat and/or providing protective covers can also help reduce or eliminate damage to the components (e.g., solar panels, batteries, circuitry, sensors, etc.)

In an example, the signal mat includes inlaid solar panels, re-chargeable battery pack(s), and LED lights and/or light panels. Example light patterns include a red X, green O, amber O, and sequencing (e.g., "moving") yellow arrow(s). The lights can provide steady lighted output, on/off or blinking/flashing, and/or run sequencing patterns. The LED lights can be housed in a waterproof enclosure for all weather applications.

A control circuit is mounted to each of the signal mats. A communications device is configured for remote communications with the communications device of at least one other signal mat. A programming module executes a coordinating program to operate the lighting circuit based at least in part on the remote communications with at least one other signal mat. The coordinating program may include turning one or more lights on and one or more lights off, sequencing, blinking or flashing, etc., all in a coordinated pattern across multiple signal mats in the system to alert travelers on or approaching the road or pathway to a traffic control plan.

During operation, the communications device of the control circuit receives a control signal from a remote device. The remote device can be a sensor device and/or another computing device such as a program application executing on a server computer, personal computer, mobile device (e.g., mobile phone, tablet, dedicated device), etc. The control signal corresponds to the traffic control plan to be implemented. For example, the control circuit can communicate with the lighting circuit to activate/deactivate the lights based at least in part on the traffic control plan specified by the control signal. Control signals can specify lighting output (e.g., on/off status, brightness, blinking, color, pattern coordination, etc.) for the control circuit to communicate to the lighting circuit. The lighting circuit controls the LED lights accordingly.

In an example, the traffic control plan can be generated at least in part based on artificial intelligence (AI) and/or a machine learning program. For example, the AI and/or machine learning program may generate a traffic control plan to include lights of the lighting circuit on one of the signal mats outputting a light pattern coordinated with the lighting circuit of at least one other of the signal mats based on user input, signal input, prior use scenarios, regulations, and/or any other information provided to the model or algorithm.

In an example, the lights of the lighting circuit can be provided as a panel to output a light pattern selected from a plurality of different light patterns. For example, a panel of more than one light can be provided to light up in different shapes (e.g., circle, X, square) and/or patterns (e.g., a moving arrow, blinking lights that mimic law enforcement blue and/or red flashing lights) on the same signal mat.

In an example, the control circuit receives a remote control signal. That is, the remote control signal may be delivered from a device not attached to or hardwired to the signal mat. The control circuit receives the remote control signal to configure output of the lighting circuit. The control circuit may receive one-way communication from the remote device and/or may interact with the remote device via bi-directional communication (e.g., a feedback loop).

In an example, the control circuit is operable to activate/deactivate lights of the lighting circuit and to control blinking/solid output, color output, and display pattern output of the lights of the lighting circuit. The output color of the lights can be at least one of red, green, and/or warning yellow, or emergency colors such blue, white, and/or red. The output color of the lights can be controlled to switch between different colors.

Before continuing, it is noted that as used herein, the terms "includes" and "including" mean, but is not limited to, "includes" or "including" and "includes at least" or "including at least." The term "based on" means "based on" and "based at least in part on."

It is also noted that the examples described herein are provided for purposes of illustration, and are not intended to be limiting. Other devices and/or device configurations may be utilized to carry out the operations described herein.

The operations shown and described herein are provided to illustrate example implementations. It is noted that the operations are not limited to the ordering shown. Still other operations may also be implemented.

FIG. 1 illustrates an implementation of example lighted traffic control devices configured to provide drivers with warnings in a work zone 1 that is partially closed for road repair.

An example lighted traffic control device 10 includes a mat 11 which can be driven over and has inlaid solar panels, a chargeable battery pack, and a designated lighting pattern 12. Example light patterns 12 may be generated by light emitting diodes (LEDs) and may include by way of example, a green "O" 14 to indicate a travel lane, a yellow "O" 16 to indicate caution (the lane is ending), and a red "X" 18 to indicate a lane closure. Other colors and/or light patterns 12 may also be provided, such as but not limited to one or more arrows (see, e.g., FIG. 6).

The lighted traffic control device 10 is configured for positioning on a road 2 to bring attention to approaching lane closures 3 and other work zone strategies (e.g., rerouting traffic, slowing traffic). It is noted that motorists are statistically more likely to straddle an object in the roadway rather than run it over. With that in mind the example lighted traffic control device 10 may be designed for widths from about 3-4 feet. In an example, the mat is about 3 inches tall and about 3 feet wide by 3 feet long. However, larger and smaller configurations are also contemplated for other application needs.

In an example, the lighted traffic control device 10 is capable of withstanding force and weight of trucks, vehicles, and equipment traveling over the roadway. For example, the mat 11 may be made of rubber and/or other hard material, and the LED lights, solar panels, and circuitry may be embedded in the mat. In an example, the LED lights, solar panels, and circuitry are waterproof for all weather applications. The example lighted traffic control device 10 may also have a no-slip design to reduce movement on the roadway.

The traffic control device 10 may include a heavy rubber mat suitable for driving over by vehicular traffic or a mat that is not readily picked up by wind or airflow generated by passing vehicles. The example lighted traffic control device may be temporarily adhered to pavement by the use of mechanical fasteners or adhesive or other anti-slip (e.g., friction) pads (see, e.g., pad 13 in FIG. 3).

In an example, traffic control device 10 may include at least one mat attachment to attach the mat 11 on or near the road surface 2. For example, the mat attachment 20 shown in FIG. 3 includes one or more spike 21 or other fasteners which may be provided through a corresponding opening 22 formed through the mat 11 and driven into the ground or roadway to secure the mat on or near the road surface 2. However, other mat attachments may also be provided instead of or in addition to the mat attachment 20, such as an adhesive, weight, chain, etc.

Figure 2:
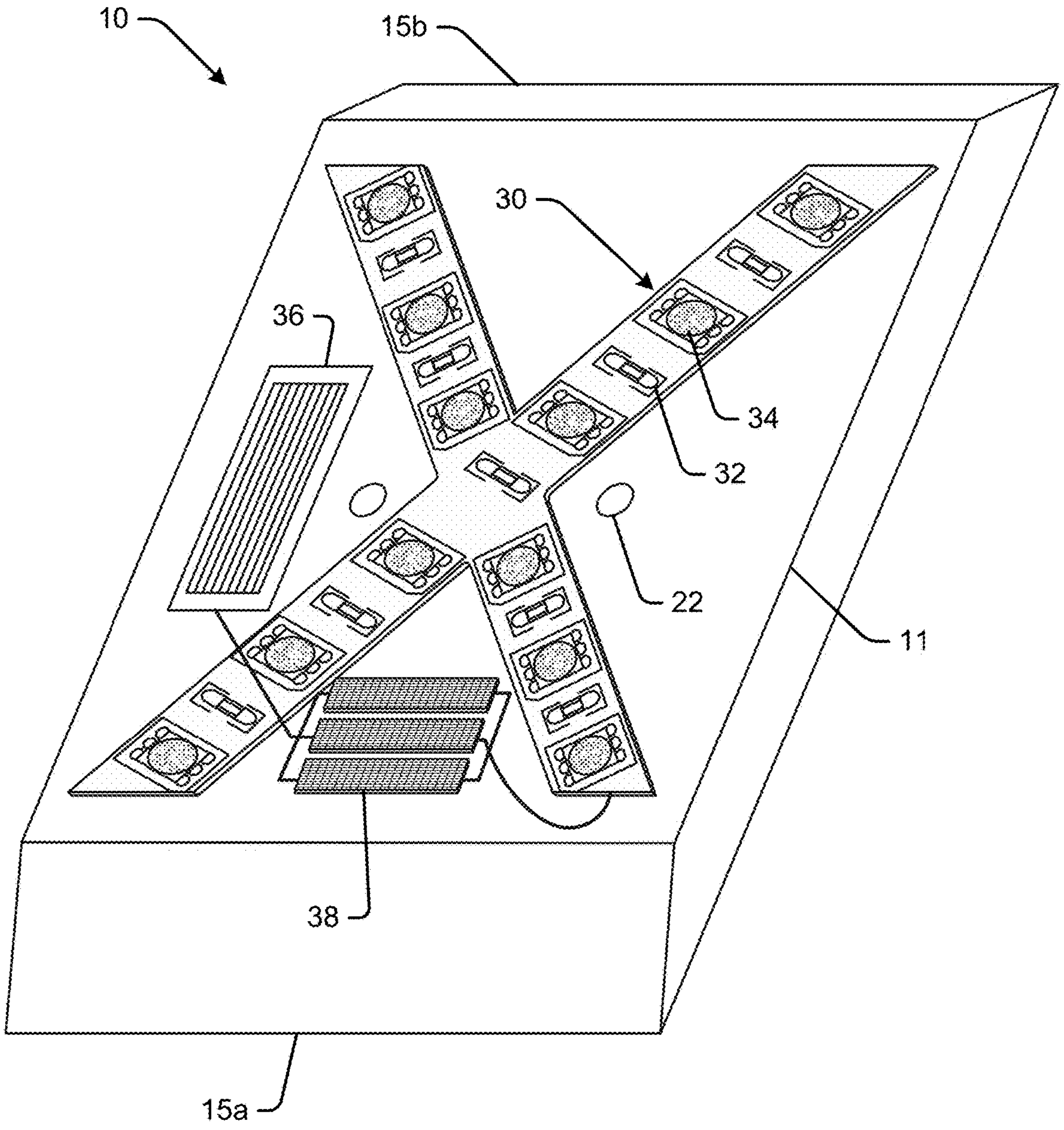
FIG. 2 is a perspective view of an example lighted traffic control device.
Figure 3:
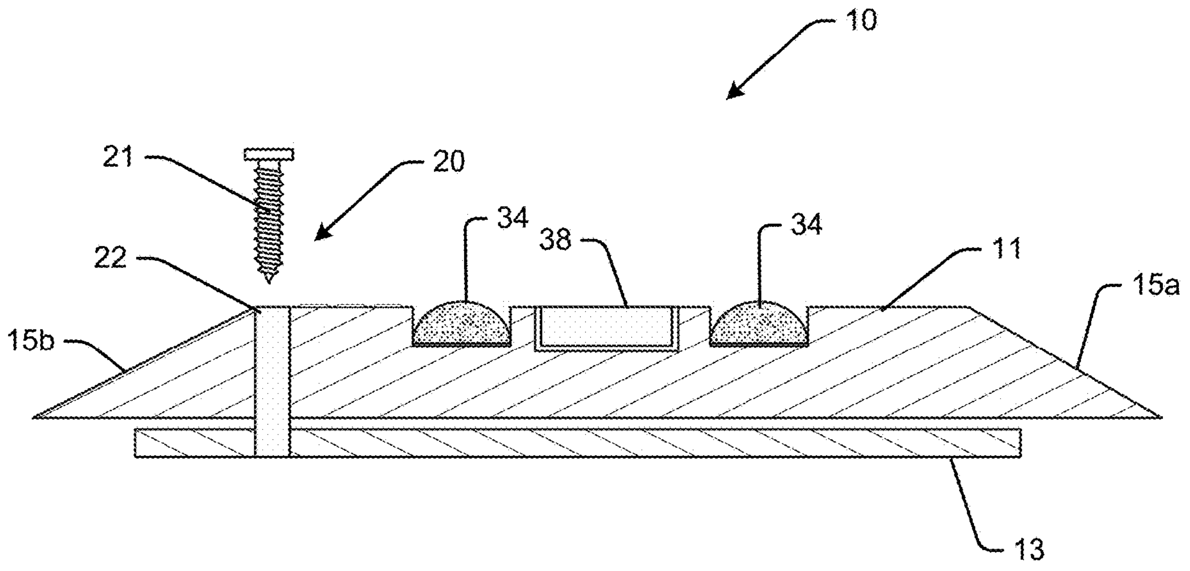
FIG. 3 is a side cross-sectional view of the example lighted traffic control device shown in FIG. 2.
Figure 4:
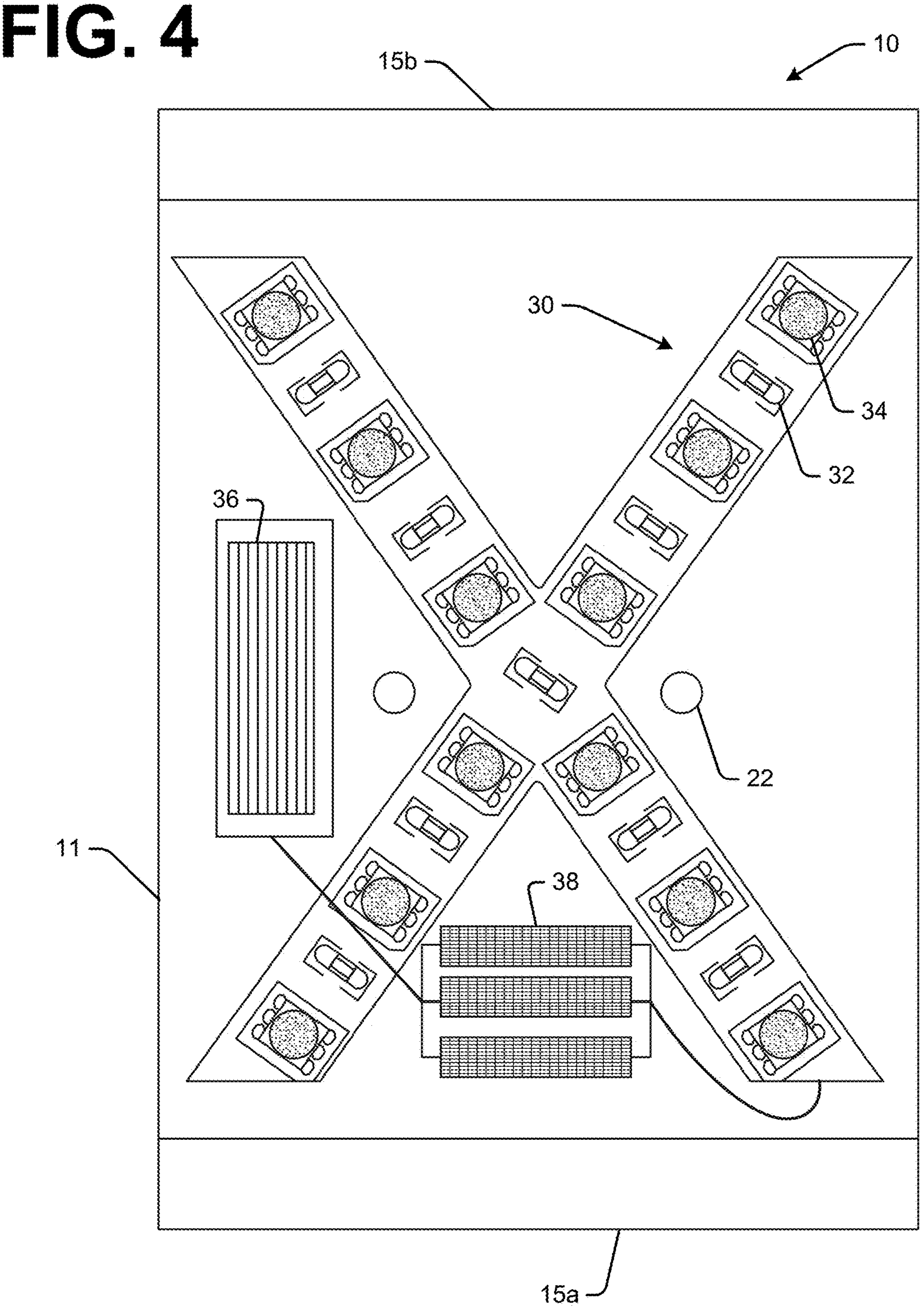
FIG. 4 is a top plan view of the example lighted traffic control device shown in FIG. 2 having an X-shape pattern.

FIG. 2 is a perspective view of an example lighted traffic control device 10. The mat 11 is shown as it may have angled entry and exit planes 15*a*, 15*b* in the event a vehicle tire travels over the mat 11. FIG. 3 is a side cross-sectional view of the example lighted traffic control device shown in FIG. 2. FIG. 4 is a top plan view of the example lighted traffic control device shown in FIG. 2 having an X-shape lighting pattern 30. The example lighted traffic control device 10 includes a mat 11 configured for placement on a road surface, and LED lights. The LED lights may be embedded into the mat (see, e.g., FIG. 3).

In an example, an LED lighting circuit 32 includes a plurality of LED lights 34. The LED lights may be provided on an LED strip or ribbon. In an example, the LED lights 34 are inset into the mat 11 to reduce or prevent damage to the LED lights 34. The LED lights 34 may be provided in a configuration or light pattern corresponding to a road sign. In this example, the LED lights 34 form an X-shape pattern 30.

The LED lights 34 are operated by a control circuit 36 integral with the mat 11. The LED lights 34 may be operated according to a road or lane closure plan. The LED lights 34 may be operated to generate any suitable output (e.g., color, brightness, and even the pattern itself) to bring attention to approaching lane closures and other work zone strategies.

In an example, the control circuit 36 may be pre-programmed (e.g., from the manufacturer) to generate a desired lighting output. In another example, the control circuit 36 is programmable. In another example, the control circuit 36 may be programmed on site, e.g., by an operator configuring the control circuit 36 on-board the device 10. In another example, the control circuit 36 receives a remote control signal. For example, the control circuit 36 may receive a remote control signal to configure and/or update output of the LED lights 34. This helps keep the user from having to go out onto the roadway to activate/deactivate and/or change output of the LED lights 34.

In an example, the LED lights 34 may be colored and/or the light output color may be changed. For example, the output color of the LED lights 34 may be at least one of "stop" red, "go" or "proceed" green, and a "warning" yellow, e.g., as may be defined by traffic safety standards. The output color of the LED lights 34 may be controllable (e.g., by the control circuit 36) to switch between the different colors. By way of illustration, the color output by the LED lights 34 may be changed from yellow to red or from red to green, depending on the needs at the worksite. Of course, other colors may also be utilized as needed by the end-user and/or application (e.g., for parade routes, for processions, etc.).

The control circuit 36 and LED lights 34 are powered by an independent (i.e., receiving no outside power) on-board power source 38 provided integral with the mat 11. In an example, the power source 38 is at least one solar panel embedded in the mat 11. The power source 38 may also include at least one battery. For example, the power source 38 includes one or more rechargeable batteries and at least one solar panel to recharge the battery. In another example, electrical power may be provided by a separate power source (e.g., a separate mat having one or more power sources to provide electrical power to one or more adjacent mats).

Figure 5:
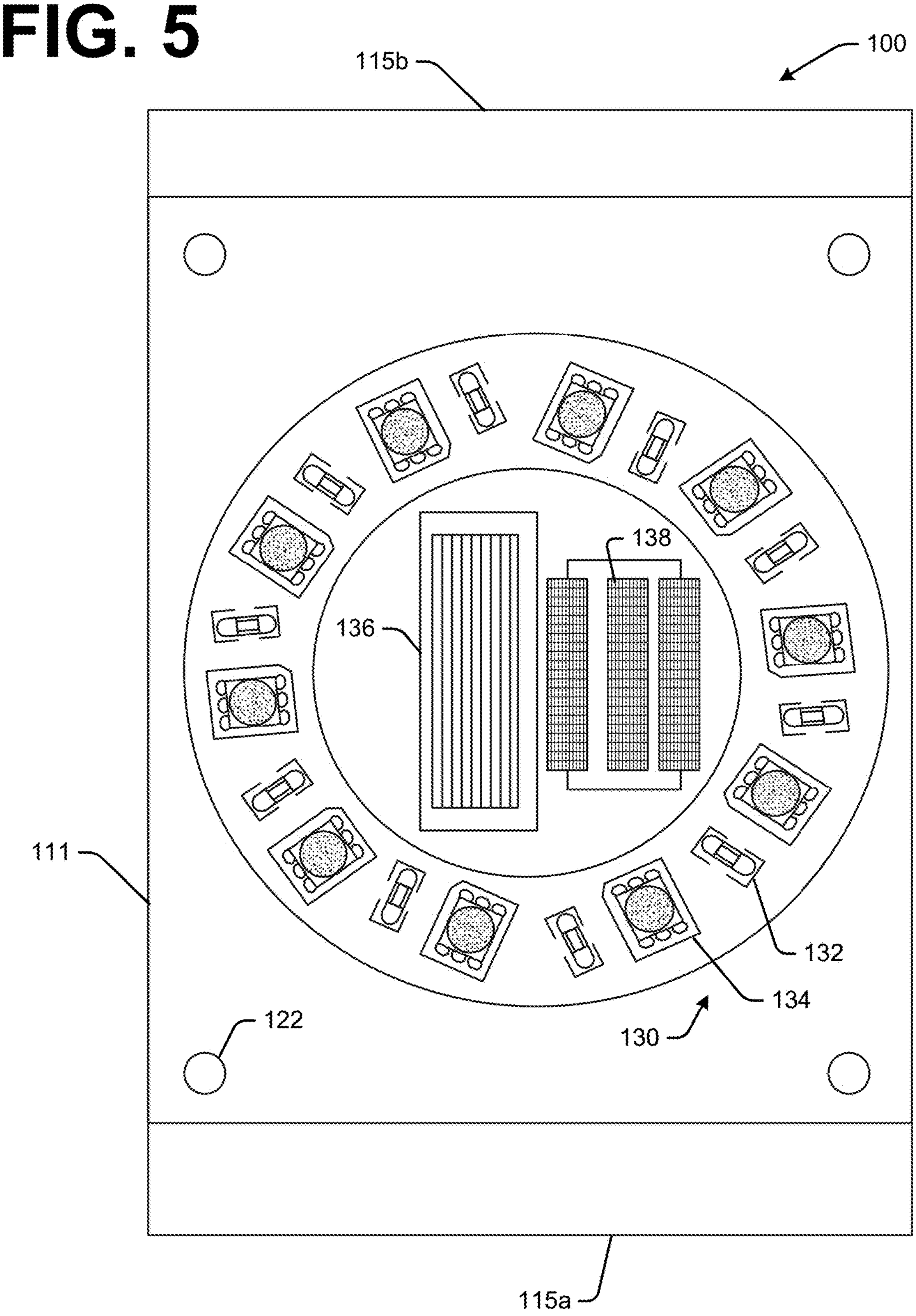
FIG. 5 is a top plan view of another example lighted traffic control device having a circle shape pattern.

FIG. 5 is a top plan view of another example lighted traffic control device 100 having a circle or "O" shape pattern 130. It is noted that 100-series reference numbers are used to describe corresponding parts already described above and may not be described again with reference to FIG. 5 where that description would otherwise be the same as previously described.

In an example, an LED lighting circuit 132 includes a plurality of LED lights 134. The LED lights may be provided on an LED strip or ribbon. In an example, the LED lights 134 are inset into the mat 111 to reduce or prevent damage to the LED lights 134. The LED lights 134 may be provided in a configuration or light pattern corresponding to a road sign. In this example, the LED lights 134 form an "O" shape pattern 130.

The LED lights 134 are operated by a control circuit 136 integral with the mat 111. The LED lights 134 may be operated according to a road or lane closure plan. The LED lights 134 may be operated to generate any suitable output (e.g., color, brightness, and even the pattern itself) to bring attention to approaching lane closures and other work zone strategies.

Figure 6:
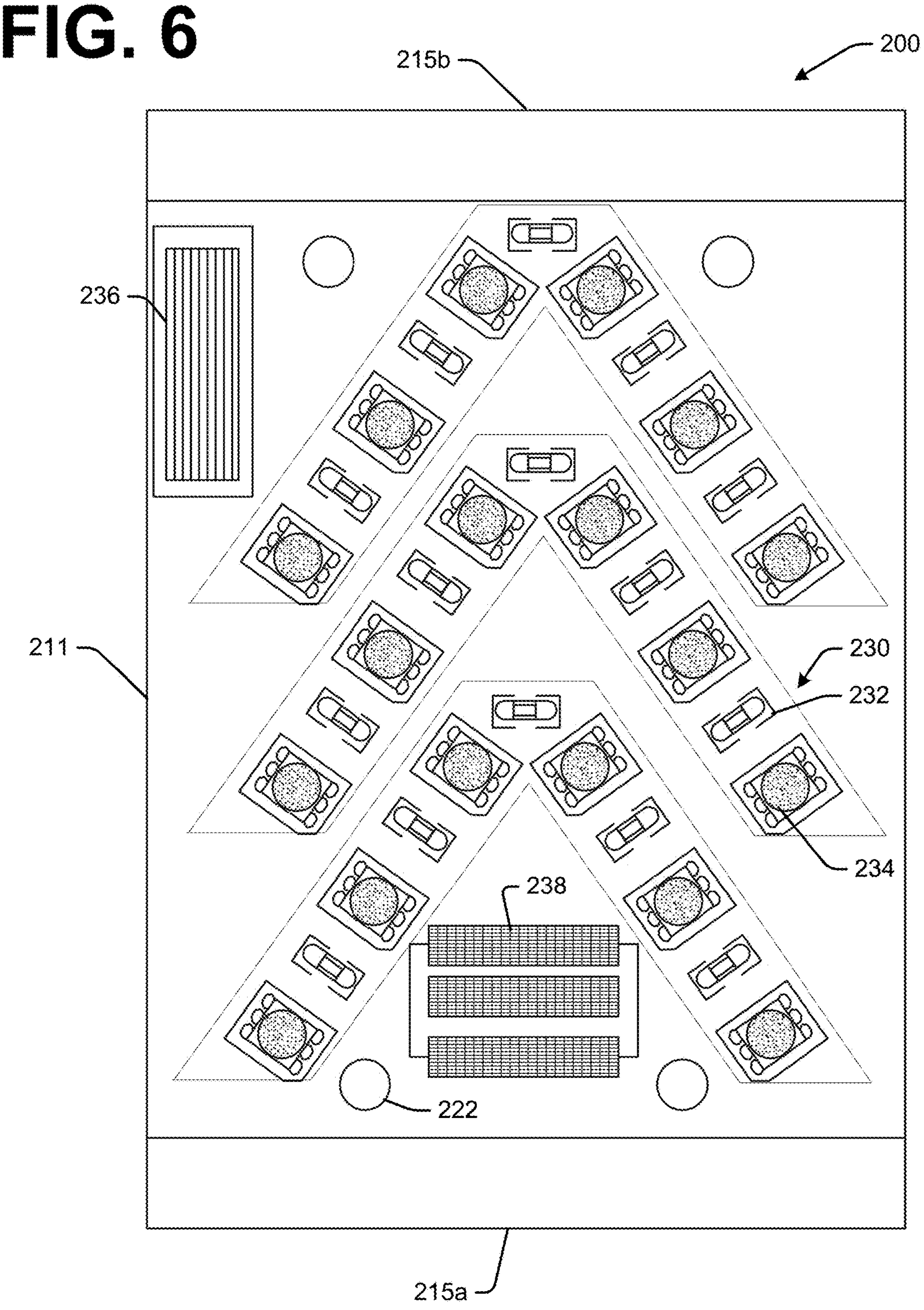
FIG. 6 is a top plan view of another example lighted traffic control device having an arrow shape pattern.

FIG. 6 is a top plan view of another example lighted traffic control device 200 having an arrow shape pattern 230. It is noted that 200-series reference numbers are used to describe corresponding parts already described above and may not be described again with reference to FIG. 6 where that description would otherwise be the same as previously described.

In an example, an LED lighting circuit 232 includes a plurality of LED lights 234. The LED lights may be provided on an LED strip or ribbon. In an example, the LED lights 234 are inset into the mat 211 to reduce or prevent damage to the LED lights 234. The LED lights 234 may be provided in a configuration or light pattern corresponding to a road sign. In this example, the LED lights 234 form an arrow shape pattern 230.

The LED lights 234 are operated by a control circuit 236 integral with the mat 211. The LED lights 234 may be operated according to a road or lane closure plan. The LED lights 234 may be operated to generate any suitable output (e.g., color, brightness, and even the pattern itself) to bring attention to approaching lane closures and other work zone strategies. For example, the arrows may be lit and dimmed or turned off sequentially to indicate forward motion. Or for example, 1 or more of the arrows may be lit while one or more of the other arrows are not lit. Different arrows may be lit with different colors and/or brightness.

Figure 7:
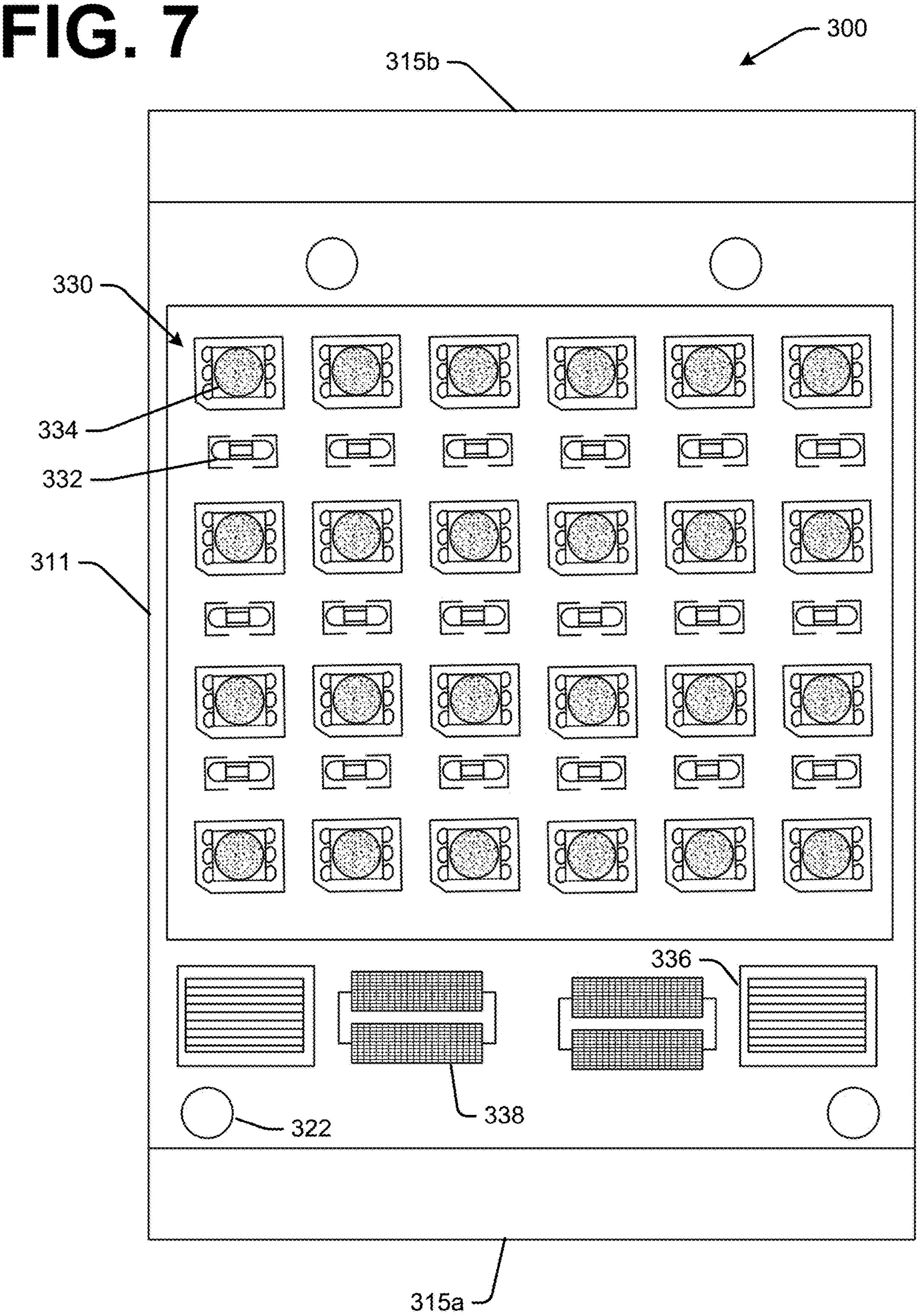
FIG. 7 is a top plan view of another example lighted traffic control device having a configurable pattern.

FIG. 7 is a top plan view of another example lighted traffic control device 300 having a configurable pattern 330. That is, the LED lights 334 are provided as a panel that can be activated to output a plurality of different shape signs. It is noted that 300-series reference numbers are used to describe corresponding parts already described above and may not be described again with reference to FIG. 7 where that description would otherwise be the same as previously described.

In an example, an LED lighting circuit 332 includes a plurality of LED lights 334. The LED lights may be provided as a panel and/or as parallel LED strips or ribbons arranged to configure multiple different patterns of light output corresponding to more than one road sign. In an example, the LED lights 334 are inset into the mat 311 to reduce or prevent damage to the LED lights 334.

The LED lights 334 are operated by a control circuit 336 integral with the mat 311. The LED lights 334 may be operated according to a road or lane closure plan. The LED lights 334 may be operated to generate any suitable output (e.g., color, brightness, and even the pattern itself) to bring attention to approaching lane closures and other work zone strategies. For example, the control circuit 336 may be operable to activate/deactivate the LED lights and to control blinking/solid output, color output, and display different patterns (e.g., the X, O, the arrows described above, and/or other patterns) to be output by the LED lights 334.

Figure 8:
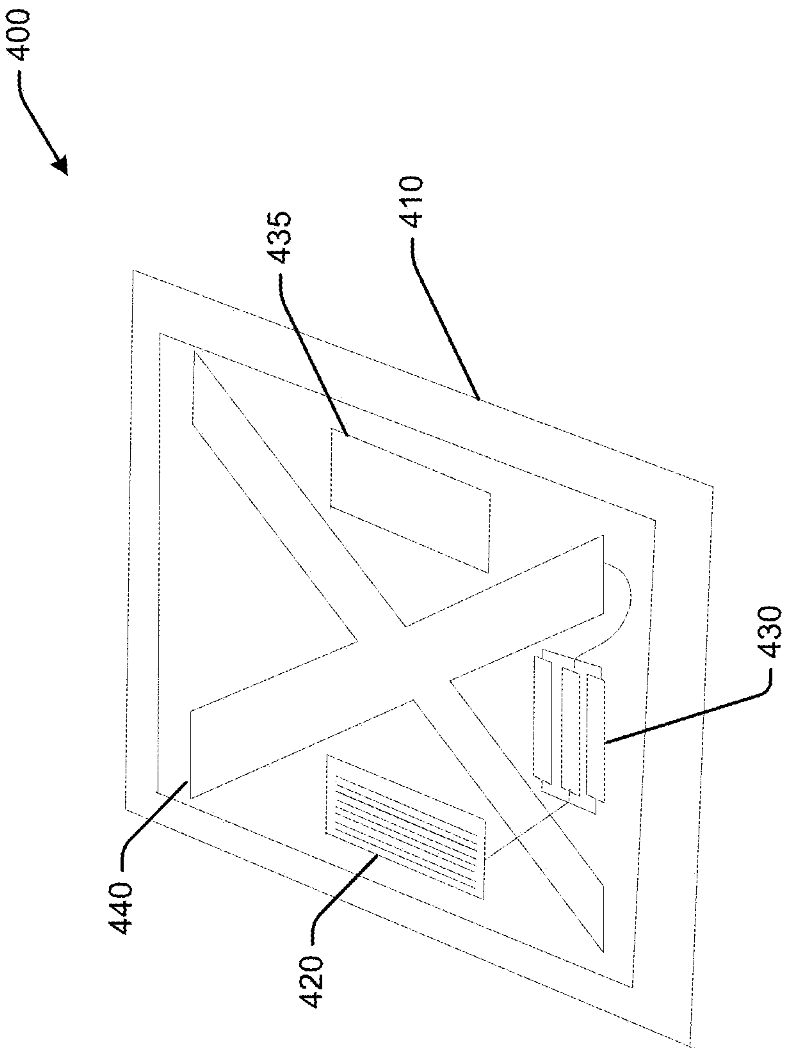
FIG. 8 shows another example traffic control device which may be implemented in a system of traffic control devices.
Figure 9:
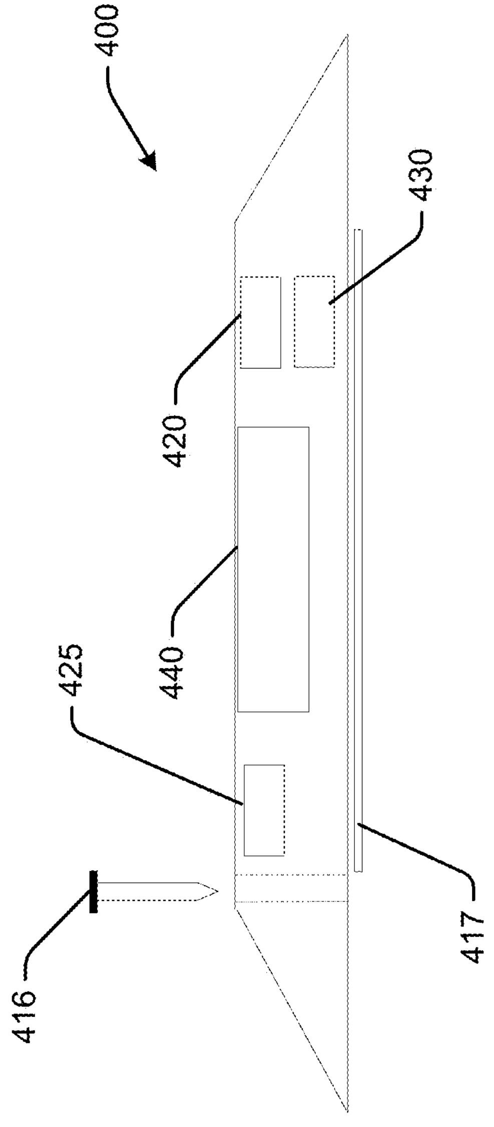
FIG. 9 is a side view of the example traffic control device shown in FIG. 8.

FIG. 8 shows another example traffic control device 400 which may be implemented in a system of traffic control devices. The traffic control system may include a plurality of separate signal mats for placement on a surface on or near a road or pathway. In an example, at least one of the separate signal mats is communicably coupled to at least one other signal mat, such that the plurality of signal mats cooperate with one or more other signal mats to implement a traffic control plan. FIG. 9 is a side view of the example traffic control device 400 shown in FIG. 8. The traffic control device 400 is shown as it may be configured as a signal mat 410. However, signs may also be incorporated into the traffic control system. Indeed, the traffic control system may also be communicatively coupled with other devices (e.g., mobile phones, vehicle head units, and/or other user interfaces).

In an example, the signal mat 410 may be about 3 inches tall and about 3 feet wide by 3 feet long. The signal mat 410 may be made of a durable material, to withstand the weight and repeated vehicular and truck traffic. It is noted that while described herein as it may be used for vehicular and truck traffic, the signal mat 410 may also be implemented to accommodate different types of traffic, such as, but not limited to, pedestrian and/or cycling traffic on walking and bicycle paths.

In an example, the signal mat 410 may be made of a pliable material, to substantially conform to a variety of different types of terrain, including uneven surfaces, slopes, curvatures, and other deployment surfaces, so that the signal mat 410 lays substantially flat once deployed on the surface. The signal mat 410 may include one or more mat attachments 415 to attach the signal mat 410 on or near the surface of the road or pathway. Suitable mat attachments 415 may include spikes 416, adhesives 417, etc.

The signal mat 410 may be engineered to support extremely high loads, often exceeding several tons. This makes them suitable for use with heavy construction machinery, transport vehicles, and even military vehicles. The signal mat 410 may be constructed to withstand harsh conditions, including rough terrain, mud, snow/ice, and wet environments. The signal mat 410 may be designed to be durable and long-lasting, reducing the need for frequent replacements.

The signal mat 410 may include non-slip surface(s) that provide traction even in slippery conditions. The surface of the signal mat 410 may feature ribs or ridges that provide additional traction and stability. This design helps prevent vehicles from slipping and ensures a secure footing.

The signal mat 410 may be constructed of rubber or other suitable polymer. Rubber is desirable due to its flexibility, durability, and non-slip properties. Rubber mats can absorb shock and provide a stable surface for vehicles. High-Density Polyethylene (HDPE) is a lightweight yet strong plastic material that is resistant to wear and tear. The signal mat 410 may also be made from composite materials that combine the strength of plastics and metals (e.g., aluminum frame) to offer superior durability and to withstand extreme loads.

The signal mat 410 may be provided together with other signal mats as a system to create temporary traffic patterns, including roadways for general traffic and access paths for construction vehicles. In an example, the signal mat 410 may include interlocking panels that can be easily connected to one another to form a stable surface. This modular design allows for flexibility in size and shape of the individual signal mat 410, making it easy to cover large areas.

The signal mat 410 may have contoured edges (e.g., ramped edges shown FIGS. 8 and 9). The edges of the signal mat 410 may be reinforced to prevent tearing and damage. This reinforcement ensures that the mats remain intact even under heavy loads and rough handling.

The signal mat 410 may be designed for quick and easy installation and removal. This allows for efficient setup and dismantling, which is essential in dynamic environments such as emergency responder situations on the roadside, construction zones, special events, etc. By way of illustration, for military operations, the signal mats 410 can be used to create temporary roads and landing strips. The signal mats 410 can provide a reliable surface for military vehicles and equipment, even in challenging terrain. In work zones, the signal mats 410 can be deployed in any of a variety of different configurations to accommodate changing needs of the construction crews and equipment. In emergency situations, the signal mats 410 can be quickly deployed to create access routes for rescue vehicles. The system can be deployed to help ensure that emergency responders can reach the affected area without interference from traffic near the site.

The signal mats 410 may include a number of embedded components. It is noted that the term “embedded” as used herein to describe the various components of the signal mat 410, means built into the mat in such a manner so as to remain below an outer surface of the mat to reduce wear and tear on these components from traffic driving over the mat.

In an example, a solar panel 420 may be provided in the signal mat 410 to provide on-demand power and/or power for an energy storage device 425 (also embedded in the signal mat 410) such as a battery.

Circuitry may also be embedded in the signal mat 410. Circuity may include, but is not limited to, a lighting circuit 430 for a plurality of lights (e.g., LED light pattern 440) embedded in the signal mat 410. The LED light pattern 440 may be any suitable shape and may be predetermined (e.g., the X shown in FIG. 8), or changeable (e.g., a panel that can be lighted in the shape of an X, an O, a series of arrows, etc.). The light pattern can be solid, blinking, or made to appear to move. For example, the light circuit may light a first arrow, then a second arrow, and a third arrow, etc., in sequence so that it appears to move. The lighting circuit 430 may be combined with the lights 440 and/or provided separately (e.g., as part of the circuitry designated at 430). The lights may include a diffuser panel or diffusion panel that scatters or softens light and/or protective cover.

The circuitry may also include a control circuit 435 mounted to each of the signal mats 410. The control circuit 435 may include a processor (e.g., a microprocessor) at least sufficient to manage a communications connection via a communications device (e.g., BLUETOOTH™, WiFi, mobile 4G or 5G data, etc.) configured for remote communications with the communications device of at least one other of the signal mats.

The circuitry may also include a programming module (e.g., the circuitry of the control circuit 435), such as a microprocessor configured to execute a coordinating program to operate the lighting circuit based at least in part on the remote communications with the at least one other signal mat to alert travelers on or approaching the road or pathway to a traffic control plan.

In an example, the communications device of the control circuit 435 receives a control signal from a remote device. The remote device can be a sensor device, and/or a computing device, such as a program application (mobile phone app) executing on a mobile device.

The control circuit 435 includes a communication device, such as a microcontroller or a wireless communication module, which acts as the interface between the system and external devices. The remote device (e.g., a central control system or another remote controller) sends a control signal wirelessly, typically using protocols like Wi-Fi, Bluetooth, or cellular networks. Commands may include, but are not limited to, turning a device on/off, adjusting lighting settings, or initiating other specific lighting actions.

The control circuit 435 communication device has a wireless receiver (e.g., a Wi-Fi or Bluetooth module) that receives the incoming control signal. This receiver decodes the signal and sends it to the microcontroller for processing. The microcontroller within the control circuit 435 processes the received signal, interprets the command, and executes the necessary actions. For example, if the command is to activate a light or trigger an alarm, the microcontroller sends the appropriate signals to the relevant components.

Various sensors (e.g., temperature, proximity, infrared) can be connected to the control circuit 435 (hardwired and/or via wireless connections). These sensors can monitor environmental conditions and collect other data. The sensor data is transmitted to the microcontroller within the control circuit 435. The microcontroller processes this data to determine the current state or to detect specific events (e.g., an object approaching the signal mat). Based on the sensor input, the microcontroller can autonomously trigger actions and/or send status updates. For example, if a proximity sensor detects an intrusion by a stray vehicle, it can activate an alarm or send a notification to a remote monitoring system to warn the workers or emergency responders to get out of the way of the stray vehicle.

Users can interact with the control system through a user interface such as a mobile app. The user interface enables users to send commands and receive status updates. The app communicates with the control circuit 435. When a user sends a command through the app (e.g., to change a setting or activate/deactivate a device), the app sends this command wirelessly to the communication device within the control circuit 435. The wireless receiver of the communication device receives the command from the app. The microcontroller then processes this command and executes the necessary actions, such as, adjusting lighting settings, turning the lights on or off, or performing other specific tasks.

In an example, the system seamlessly integrates signals from remote devices, sensor inputs, and mobile app commands. The microcontroller coordinates these inputs to ensure smooth and efficient operation. The control circuit 435 can also include a feedback mechanism. After executing a command, it sends a confirmation or status update back to the mobile app or remote device, informing the user of the action taken and the current state of the system.

In an example, the communication device within the control circuit 435 receives and processes control signals from remote devices and mobile apps, as well as sensor inputs to aid in executing a traffic control plan. The circuitry of the traffic control system helps ensure efficient coordination and execution of commands, providing real-time feedback to users responsible for implementing the traffic control plan. This setup allows for flexible, remote control of the system, enhancing its functionality and user experience.

By way of illustration, the control signal(s) communicated to the signal mat(s) and/or between signal mats correspond to the traffic control plan. The control circuit 435 communicates with the lighting circuit to activate/deactivate the lights based at least in part on the traffic control plan specified by the control signal. For example, the control signal specifies lighting output (individual lights or groups of lights to activate/deactivate, brightness, color, duration, steady/blink, etc.) for the control circuit 435 to communicate to the lighting circuit.

In an example, the lights of the lighting circuit on one of the signal mats output a light pattern that coordinates with the light pattern of one or more other signal mats. The lights of the lighting circuit can be provided as a panel or group of lights to output a light pattern selected from a plurality of different light patterns. An example of a panel or group of lights that can output more than one pattern is shown and discussed below with reference to FIG. 11.

In an example, the control circuit 435 receives a remote control signal during operation, e.g., to configure output of the lighting circuit. The control circuit 435 is operable to activate/deactivate lights of the lighting circuit and to control blinking/solid output, color output, display pattern, and other output parameters of the lights of the lighting circuit. For example, the output color of the lights may be one of red, green, and/or warning yellow. The output color of the lights can also be controlled to switch between the different colors (similar to a traffic signal or "stop" light).

In an example, the traffic control plan is generated at least in part based on artificial intelligence (AI) and/or at least in part based on a machine learning program or algorithm. Traffic control plans are detailed instructions or "blueprints" that outline how traffic is to be managed, e.g., within a work zone or during an emergency responder situation. Traffic control plans may include the signal mat(s) disclosed herein, and optionally additional other traffic control devices such as, but not limited to signs, barricades, cones, and temporary traffic signals. The signal mat(s) and optional other devices help guide and inform road users about the presence of a work zone or emergency situation, or other traffic situation (vehicle, truck, and/or pedestrian, and even aircraft). The traffic control plan aims to minimize congestion, prevent accidents, and ensure the safety of workers, pedestrians, motorists, and others that may be involved.

Artificial intelligence (AI) and machine learning algorithms can significantly enhance the development and implementation of the traffic control plans disclosed herein for implementing the signal mats 410 in work zones and emergency responders at the scene of a traffic accident. An AI-driven system can analyze real-time traffic data from various sensors, cameras, and GPS devices to detect accidents and predict traffic flow patterns. Upon detecting an incident, AI can generate an optimized traffic control plan that includes the use of signal mats 410 for the dynamic rerouting of vehicles, deploying the signal mats 410 in a manner to warn and guide motorists, and adjusting lighting patterns, timing, etc. of the signal mats 410.

In addition, utilizing Artificial intelligence (AI) and machine learning algorithms can continuously improve traffic management strategies by deploying the signal mats 410 based on historical data and even in real time based on current and evolving traffic patterns. As such, Artificial intelligence (AI) and machine learning algorithms can be implemented as part of the system described herein to help ensure the signal mats 410 are implemented in a manner to provide safer and more efficient management of both routine traffic routes (e.g., for sporting and special events), work zones, and emergency situations. The integration of Artificial intelligence (AI) and machine learning algorithms with the traffic control system disclosed herein help minimize congestion, enhance safety for both workers and drivers, and ensure that emergency personnel can respond promptly and effectively.

Traffic control plans are essential for ensuring safety and efficiency during road work and emergency response situations. Lighted signage plays a crucial role in these plans. The signal mats 410 disclosed herein are highly visible and can be seen from a distance, even in poor weather conditions. The signal mats 410 may be equipped with LED lights that provide 360-degree visibility. The signal mats 410 can be placed on or near the surface of the road to mark the boundaries of the work zone or emergency area according to the traffic control plan, and can be used to indicate lane closures, detours, or areas where workers are present. By providing clear and bright warnings, the signal mats 410 can help alert drivers to slow down and proceed with caution. This reduces the risk of accidents and ensures the safety of both workers and motorists.

In emergency situations, the signal mats 410 can be quickly deployed to create a safe zone around the incident. The signal mats 410 help emergency responders by clearly marking the area and guiding traffic away from the scene. The lighted mats enhance safety by making work zones and emergency areas more visible to drivers. This reduces the likelihood of collisions and accidents. By clearly marking the boundaries of a work zone or emergency area, lighted mats help maintain traffic flow and reduce delays. The lighted mats can be used in various settings, including road construction, maintenance, and emergency response. They are durable and weather-resistant, making them suitable for different conditions.

In an example, the control circuit 435 may implement an intrusion alarm to alert workers in the work zone or emergency responders that an errant vehicle may have intruded into the work area so that the workers or emergency responders can get to safety out of the path of the vehicle. An example intrusion alarm includes a photo sensor (e.g., photocell or Infrared IR sensor). A photocell detects changes in light levels. When a vehicle drives over the mat, it momentarily blocks light or causes a shadow, triggering the sensor. An Infrared (IR) proximity sensor can detect solid objects (such as tires or vehicles) by emitting and detecting reflected IR light. A microcontroller processes the signal from the photo sensor and activates the alarm. The alarm (e.g., audio and/or visual alert(s)) are connected to an output pin of the microcontroller to trigger the alarm. If the alarm requires a higher voltage (e.g., 12V) than the microcontroller's output pin can provide, a relay module can switch on the alarm. Alerts can also be sent to the workers' mobile devices in addition to the audible alarm.

In an example, the intrusion alarm operates as follows. When a vehicle drives over the mat, the photo sensor (or IR sensor) detects the vehicle. The sensor sends a signal to the microcontroller indicating a change in state (e.g., detecting something above the mat). The microcontroller reads the sensor's signal and determines whether to trigger the alarm. If the sensor detects a vehicle, the microcontroller activates the buzzer. The microcontroller sends a signal to the audio and/or visual alert output to activate, producing a loud warning sound, similar to a fire alarm, to alert workers in the work zone. The microcontroller can also send a message to notify workers on their mobile devices.

As noted above, the lighted traffic control mats can also be provided for pedestrian use, helping meet compliance with The Americans with Disabilities Act (ADA), and eliminating tripping hazards. The signal mat 410 is designed to meet the latest ADA compliance standards, making it safe and accessible for all pedestrians, including those with disabilities. The signal mat 410 is engineered to minimize tripping hazards, ensuring a smooth and secure surface. This can be helpful for maintaining safety in public areas, especially where pedestrian traffic is high.

The signal mat 410 may feature wireless capabilities for remote control by users, offering ease of management. An intrusion alarm can be integrated, using sensors and a microcontroller to detect unauthorized access and alert users locally and remotely. The signal mat 410 includes flashing and steady burn lights to enhance visibility, similar to existing warning lights. The control setup involves field devices, a microcontroller with wireless communications capabilities, mobile app integration, and security measures, such as device pairing and encryption. For the alarm system, components include photo sensors, a microcontroller, a loud buzzer or other audible warning, and optional Wi-Fi or other wireless communications modules for remote alerts. The system can be powered by batteries or solar panels, ensuring its functionality in various locations.

Wireless communications enables field operators to manage and adjust the settings of the signal mat 410, such as lighting patterns and alarm activation, without needing physical proximity.

The signal mat 410 is equipped with LED lights that can flash and/or maintain a steady burn. This feature enhances visibility and can be customized based on the specific requirements of the situation. For example, flashing lights can be used to draw immediate attention in high-risk areas, while a steady burn can indicate ongoing caution. The control over these lighting patterns is managed through the wireless capabilities of the signal mat 410.

Figure 10:
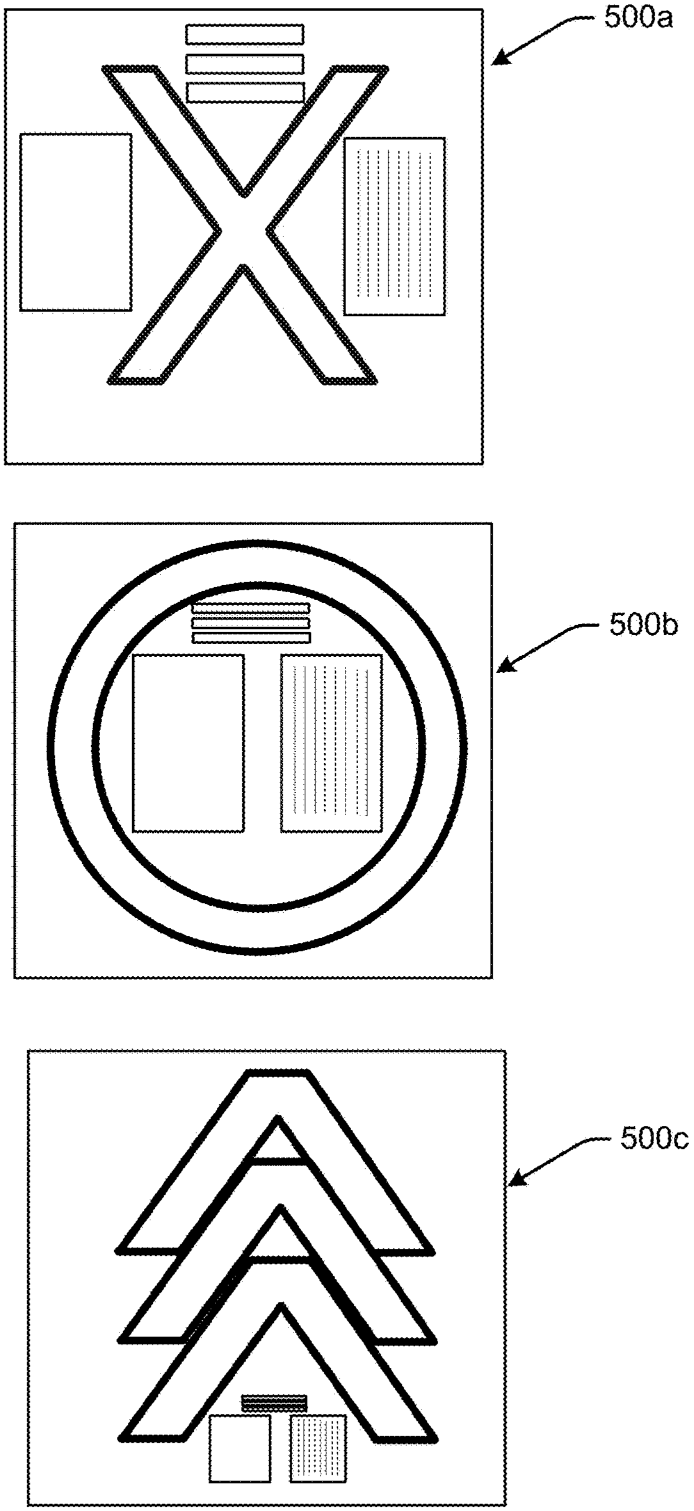
FIG. 10 are top views of example traffic control devices which may be implemented in a system of traffic control devices.
Figure 11:
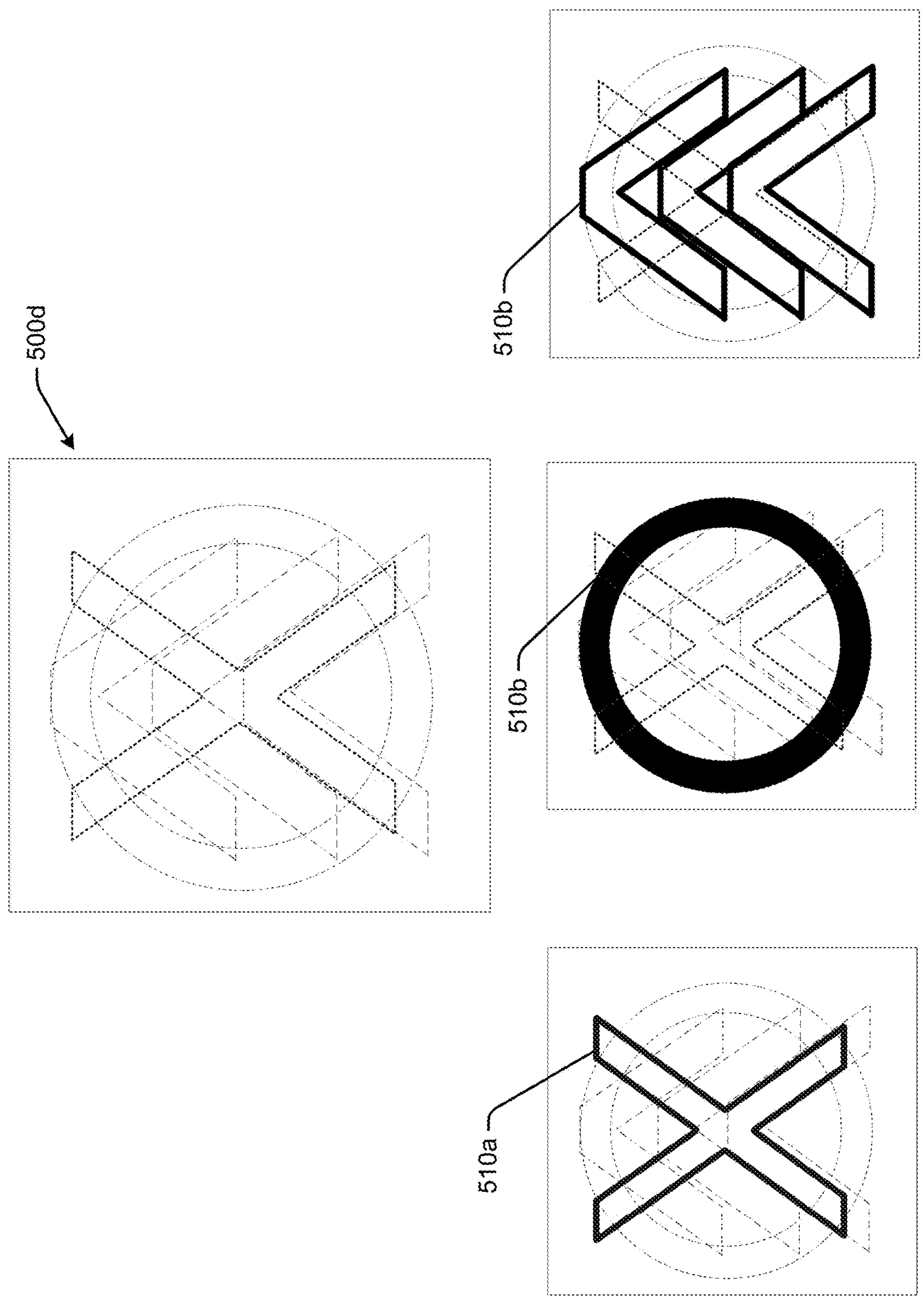
FIG. 11 shows another example traffic control device which may be implemented in a system of traffic control devices.

FIG. 10 are top views of example traffic control devices 500*a*, 500*b*, and 500*c*, which may be implemented in a system of traffic control devices. Each of the traffic control devices 500*a*, 500*b*, and 500*c* is preconfigured with a pattern, including an X (device 500*a*), an O (device 500*b*), and arrows (device 500*c*) which may be sequenced to show movement. FIG. 11 shows another example traffic control device 500*d* with a lighting panel which may be configured to output different lighting patterns on the same signal mat in a system of traffic control devices. The traffic control device 500*d* is shown with different patterns activated in the same lighting panel, including an X (pattern 510*a*), an O (device 510*b*), and arrows (device 510*c*). Again, the arrows may be sequenced to indicate movement.

Each signal mat of the example traffic control devices 500*a*, 500*b*, 500*c*, and 500*d* is made of heavy-duty rubber, ensuring it can withstand various weather conditions and the wear and tear of being on or near busy roads. The signal mat is about 3 inches tall, which helps to be noticeable to travelers. The dimensions of the signal mat 410 (about 3 feet by 3 feet) makes it large enough to display clear, visible signals without being cumbersome or obstructive.

The control circuit in the signal mat is equipped with a communications device that can receive signals from a range of remote devices. This can include sensor devices that detect traffic conditions, computing devices, and mobile device applications. This flexibility allows the signal mat to adapt to real-time changes in traffic conditions based on the signals received.

The lighting circuit in the signal mat can produce various light patterns, including blinking and solid lights, to alert travelers effectively. The lights can coordinate with other signal mats in the system to create a unified signal pattern that enhances visibility and understanding. The lights can also display different colors—red for stop, green for go, and yellow for caution—making the signals intuitive and easy to follow.

The traffic control plan can be generated using artificial intelligence (AI) and machine learning algorithms. As discussed above, these technologies can analyze traffic data and predict optimal traffic flow patterns. This means the system can dynamically adjust to changing traffic conditions, reducing congestion and improving safety by providing timely and accurate traffic signals.

The control circuit allows for detailed adjustments to the lighting circuit. This includes turning the lights on or off, changing between blinking and solid outputs, and adjusting the color and display patterns of the lights. These adjustments can be made remotely, ensuring that the system can respond quickly to changes in traffic conditions. The ability to switch between colors, such as red, green, and yellow, provides clear, universally understood signals to travelers.

As already discussed above, the control circuit of the signal mat can receive control signals from various remote devices, such as sensors, computing devices, or mobile applications, and coordinate lighting of a plurality of signal mats, to adapt to the traffic control plan. The lights on each signal mat can output coordinated light patterns, for example, with options to blink or stay solid, and can display different colors (red, green, warning yellow). The control circuit allows for remote adjustments to the lighting circuit on the signal mat 410, including activating/deactivating lights and changing light patterns and colors. The traffic control plan can be generated and even modified in real-time, using AI and machine learning to optimize traffic flow. This innovative system offers a flexible and intelligent solution to traffic management, enhancing safety and efficiency on roads and pathways.

Figure 12:
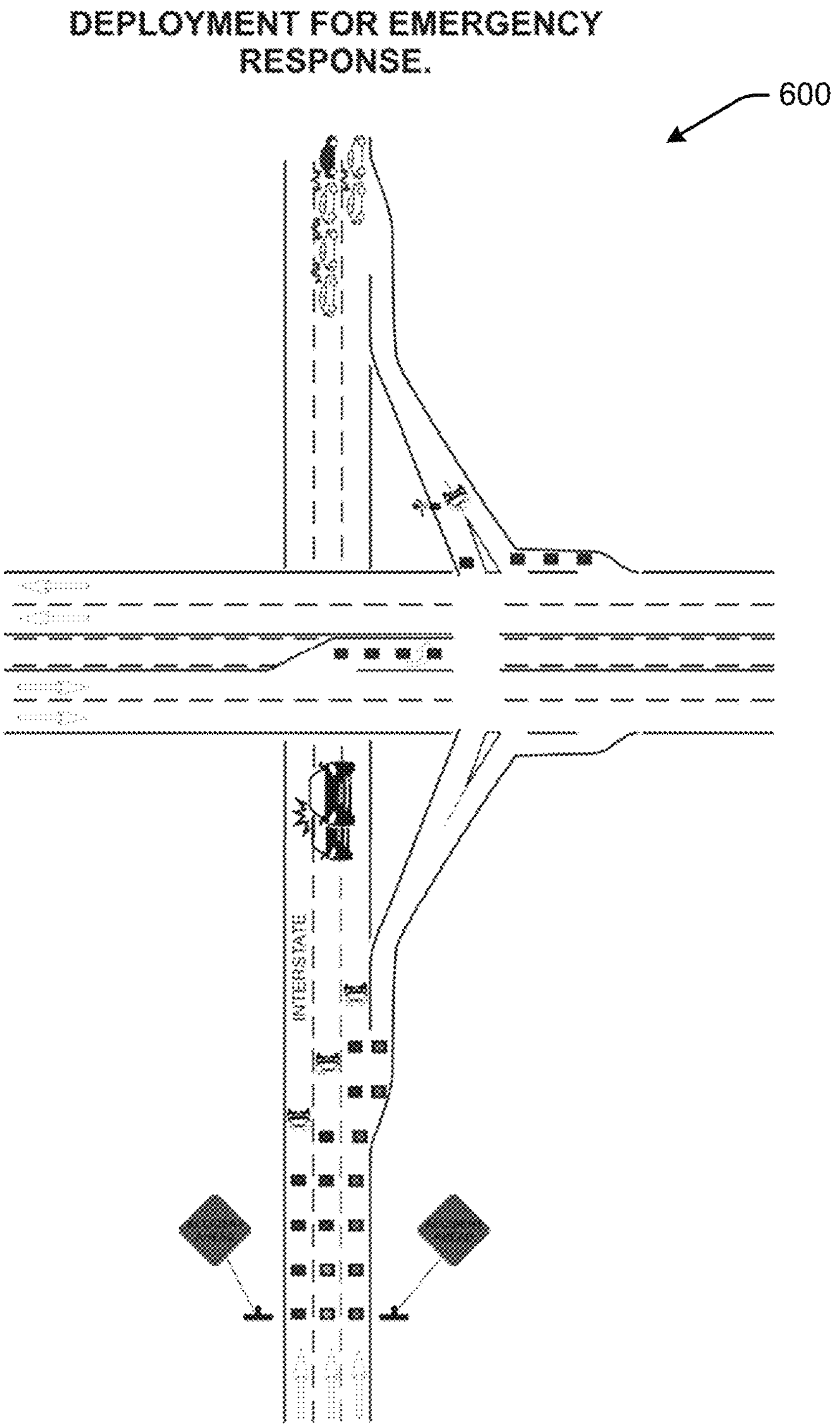
FIG. 12 illustrates an example deployment of traffic control devices configured for an emergency response situation.

FIG. 12 illustrates an example deployment of traffic control devices configured for an emergency response situation 600. This example demonstrates how the traffic control system can be effectively used in emergency situations to manage traffic and enhance the safety of both responders and the public. By providing clear, coordinated light signals and allowing for real-time adjustments, the system helps to ensure a safe and efficient response to roadside accidents.

In an example, emergency responders arrive at the scene of a traffic accident. They quickly deploy several signal mats around the accident site, placing them at strategic points to manage approaching and diverting traffic. The control circuits in the signal mats are activated and configured to communicate with each other and with remote control devices held by the emergency responders. The mats are programmed with an initial traffic control plan to manage the immediate situation. Sensors on the signal mats detect approaching vehicles. The mats near the accident site display a solid red light to stop traffic, preventing vehicles from entering the dangerous area.

In an example of dynamic light coordination, signal mats placed further away from the accident start displaying yellow blinking lights to alert drivers to slow down and prepare to stop. These mats help manage the flow of traffic and reduce the risk of additional accidents. To help ensure the safety of emergency responders and accident victims, signal mats within the immediate vicinity of the accident display red or yellow lights, indicating restricted or cautionary zones. This helps create a safe workspace for responders to conduct their operations without interference from moving traffic. Emergency responders can use remote devices, such as mobile applications, to adjust the light patterns on the mats as the situation evolves. If additional emergency vehicles need to arrive or depart, the mats can be reconfigured to provide clear and safe pathways.

As the accident scene is cleared, the system helps in gradually resuming normal traffic flow. Signal mats at critical points might display green lights, guiding vehicles safely past the cleared accident site and back onto the main road. If there are ongoing hazards, such as debris on the road, the mats can continue to display appropriate warnings, ensuring that drivers remain alert and cautious.

Figure 13:
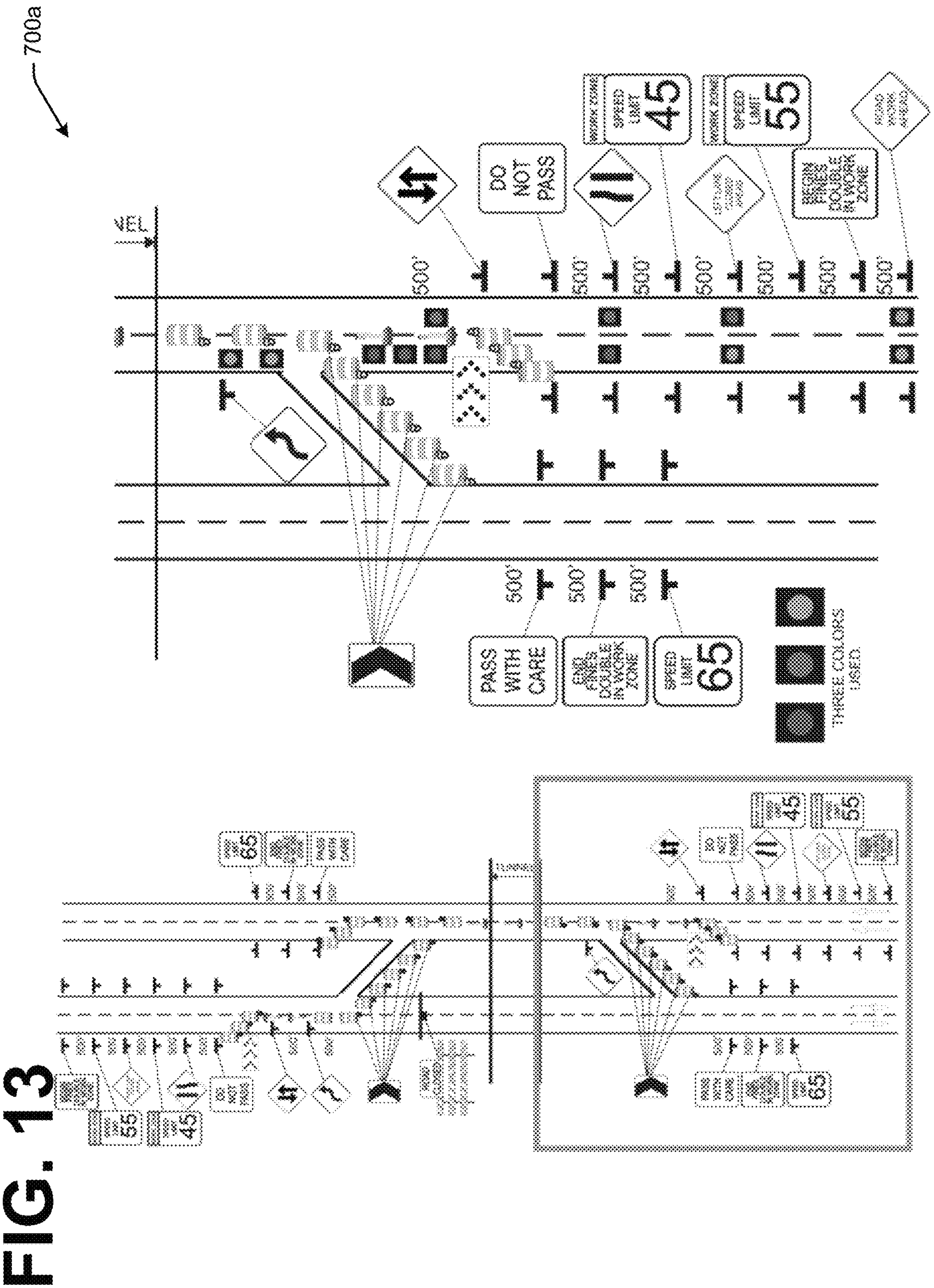
FIGS. 13-15 illustrate examples of deployment of traffic control devices configured for various types of work zone.
Figure 14:
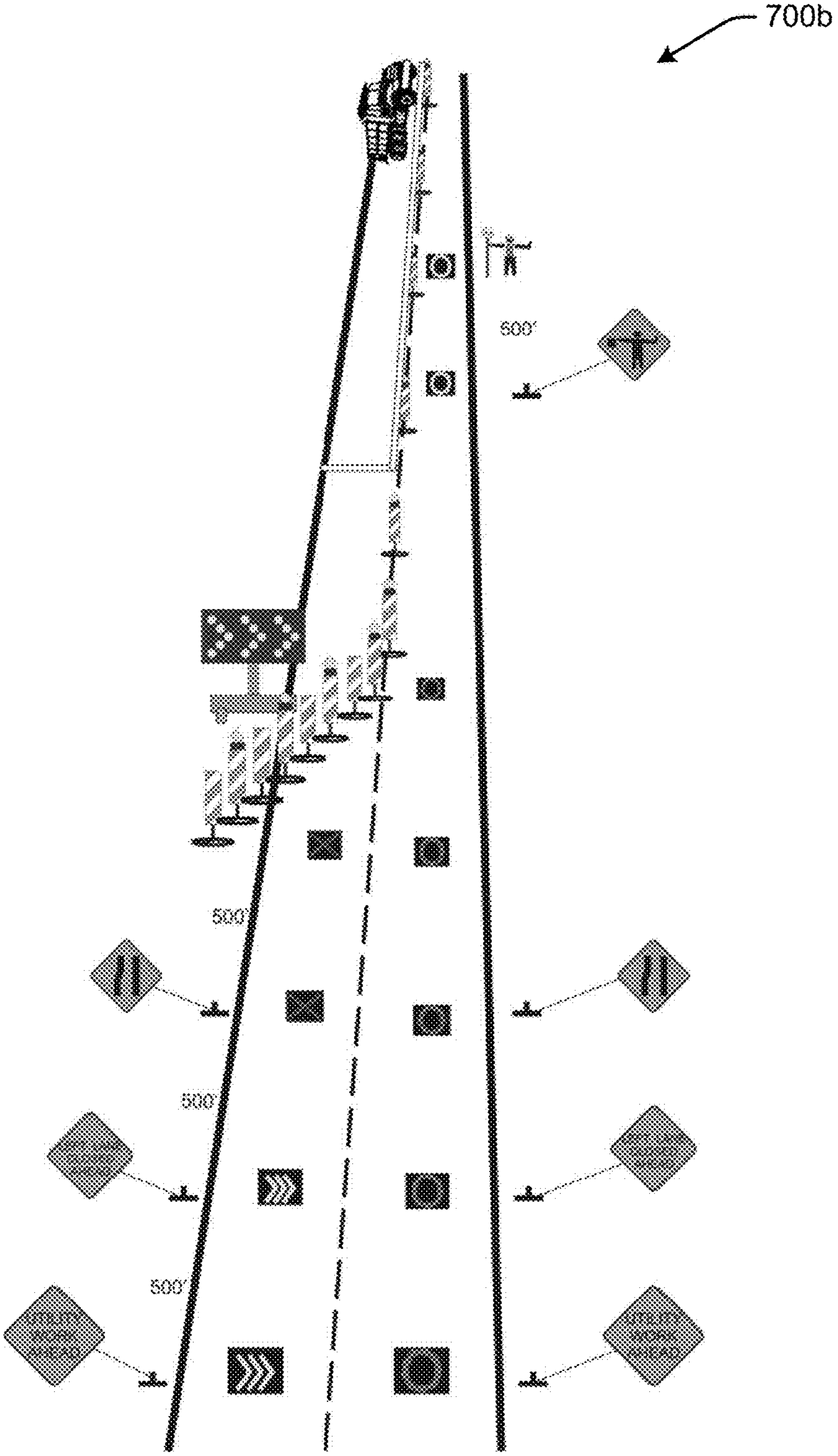
Figure 15:
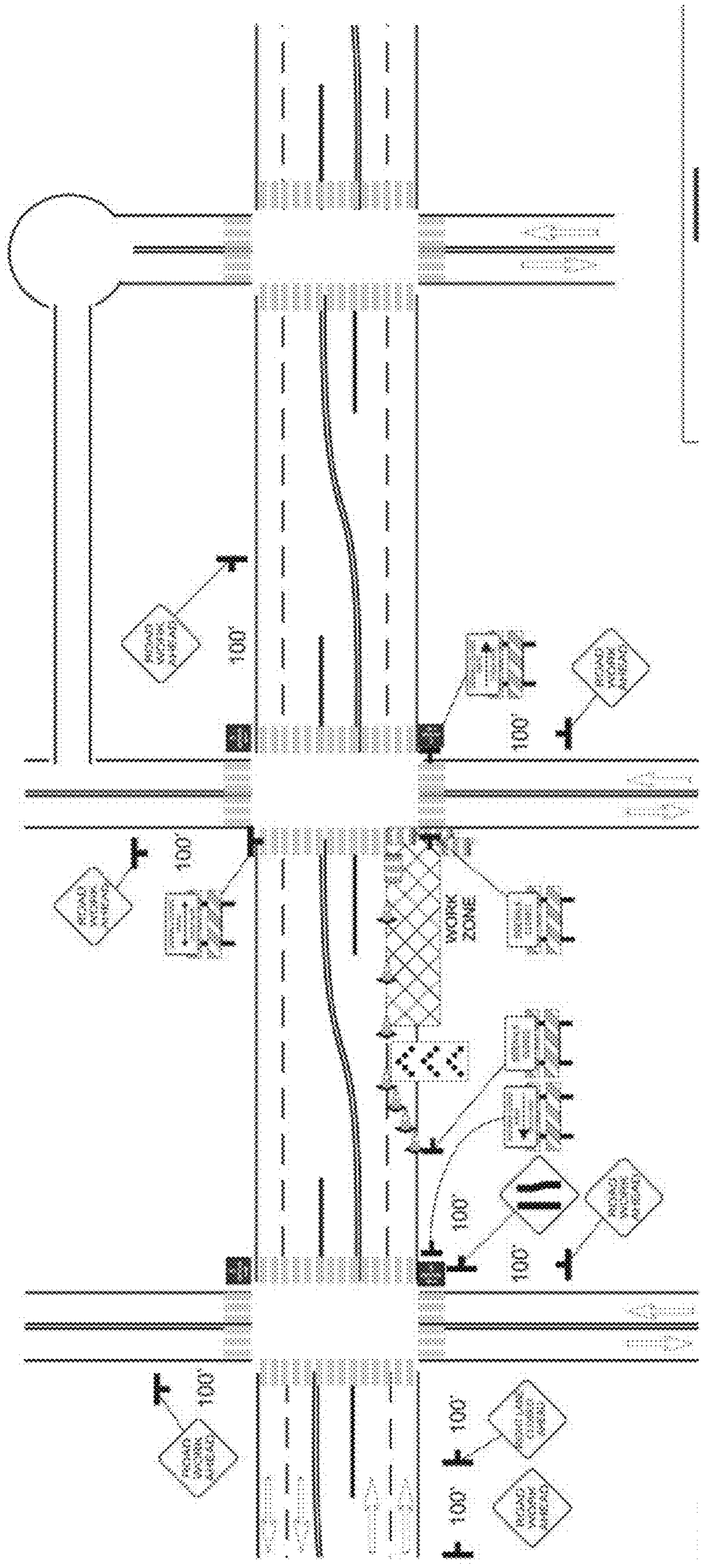

FIGS. 13-15 illustrate examples of deployment of traffic control devices configured for various types of work zones 700*a-c*. These examples illustrate how the traffic control system can be used to manage traffic flow and enhance worker safety at a road work site. By dynamically adjusting light patterns and coordinating with remote devices, the system ensures that both drivers and workers remain safe and that traffic moves smoothly through the construction zone.

The traffic control system includes multiple signal mats designed for placement on or near roads and pathways. Each mat is equipped with a lighting circuit featuring multiple lights and a control circuit. The control circuit contains a communications device that allows for remote interaction with other signal mats and executes a coordinating program to manage the lighting circuit. This system aims to alert travelers about the traffic control plan.

When implemented for road work traffic management, signal mats can be placed at various points around the road work area. As shown in FIGS. 13-15, the signal mats are located at the start and end of the construction zone, as well as at key points where traffic needs to be controlled, such as lane merges and pedestrian crossings.

During initialization, the control circuits in the signal mats are activated, and the mats are programmed with the traffic control plan, which can be generated using AI and machine learning to optimize traffic flow and safety.

After deployment and during operation, sensors on the signal mats detect the presence and flow of vehicles approaching and passing through the road work zone. These sensors send real-time data to the control circuits.

In an example, the system may implement dynamic light coordination. Based on the traffic data, the mats display coordinated light patterns to manage vehicle flow. For example, mats at the entrance to the work zone might show a solid red light to stop traffic while workers move equipment or complete a task. Once it's safe to proceed, the mats can switch to a green light, allowing vehicles to move through the area in an orderly fashion.

In an example, the system may generate worker safety alerts. To help ensure worker safety, mats within the work zone can display blinking yellow lights, warning drivers to slow down and be cautious. If workers need to cross the road, the mats can coordinate to show red lights, stopping traffic temporarily. If a vehicle leaves the route, workers can be alerted in advance so that they can take action, such as getting to safety, to avoid being in the path of the stray vehicle and potentially being injured.

In an example, remote adjustments can be made by traffic control supervisors. Traffic control supervisors can use remote devices, such as mobile applications, to adjust the light patterns as needed. For instance, if there's an unexpected increase in traffic volume, the system can extend stoppages or pause durations to reduce or even prevent traffic backups and congestion.

The control circuits can also receive control signals from remote devices, such as sensor devices that detect hazardous conditions (e.g., a sudden rain), increasing traffic, emergency response vehicles (e.g., indicating a traffic accident). These signals can be implemented to trigger the signal mats to adjust their light patterns accordingly, enhancing safety.

In an example, traffic flow transitions can be implemented according to the time of day. For example, as road work concludes for the day, the system gradually transitions traffic back to normal flow. Signal mats display light patterns that guide vehicles out of the construction zone safely and efficiently.

If the work zone remains partially active during nighttime, the mats can display specific light patterns, such as blinking red or yellow, to alert drivers of the ongoing work and the need for caution.

Still other examples are contemplated as being within the scope of the disclosure herein. By way of further non-limiting illustration, the traffic control system may be implemented for school zone traffic management. This traffic control system is used to manage traffic flow at a busy intersection near a school during drop-off and pick-up times. It will be readily understood by those having ordinary skill in the art after becoming familiar with the teachings herein, that similar strategies may be implemented for special events (e.g., concerts, sporting events, etc.).

In the case of a school zone, multiple signal mats are placed strategically on the roads leading to and around the school. Each mat is connected to a central control unit via remote communication devices. As the school day begins, sensors detect an increase in vehicle and pedestrian traffic. These sensors send signals to the control circuits of the signal mats. Based on the received signals, the mats activate their lighting circuits to display coordinated light patterns. For example, mats near crosswalks might blink yellow to alert drivers to slow down and prepare to stop for pedestrians. Mats at the intersection could show green for vehicles moving towards the drop-off zone and red for other directions to prevent congestion.

The control circuits use AI and machine learning algorithms to analyze traffic patterns in real-time. If traffic begins to back up, the system can dynamically adjust the light patterns, such as extending the green light duration for the drop-off lane or introducing a red light to allow crossing guards to safely guide students across the road.

The traffic plan can also be optimized. By way of example, the system can generate and update the traffic control plan continuously based on the live data. This includes adjusting light patterns, blinking rates, and colors to ensure optimal traffic flow and safety.

Before the peak pick-up time, the system prepares by analyzing historical data (e.g., day of week, time of day, seasonal, holidays, etc.) to anticipate high traffic volumes. The signal mats start by displaying a pattern that slowly transitions from yellow to red near crosswalks, alerting drivers well in advance.

The system may implement dynamic light coordination. For example, as parents arrive, the system again uses sensors to monitor traffic. If a line of cars forms, the mats can coordinate to create a "green wave," where cars are given sequential green signals to keep moving efficiently through the drop-off area.

The system may implement responsive adjustments. For example, if an unexpected surge in traffic occurs, the system responds by modifying light patterns to balance vehicle flow with pedestrian safety. For instance, if there's a sudden influx of pedestrians, the lights at crosswalks might switch to a solid red, giving pedestrians ample time to cross safely.

Once the pick-up rush subsides, the system gradually returns to normal operation, with standard light patterns resuming to maintain regular traffic flow. This example highlights the flexibility and intelligence of the traffic control system, ensuring safety and efficiency during high-traffic periods in sensitive areas like school zones.

Figure 16:
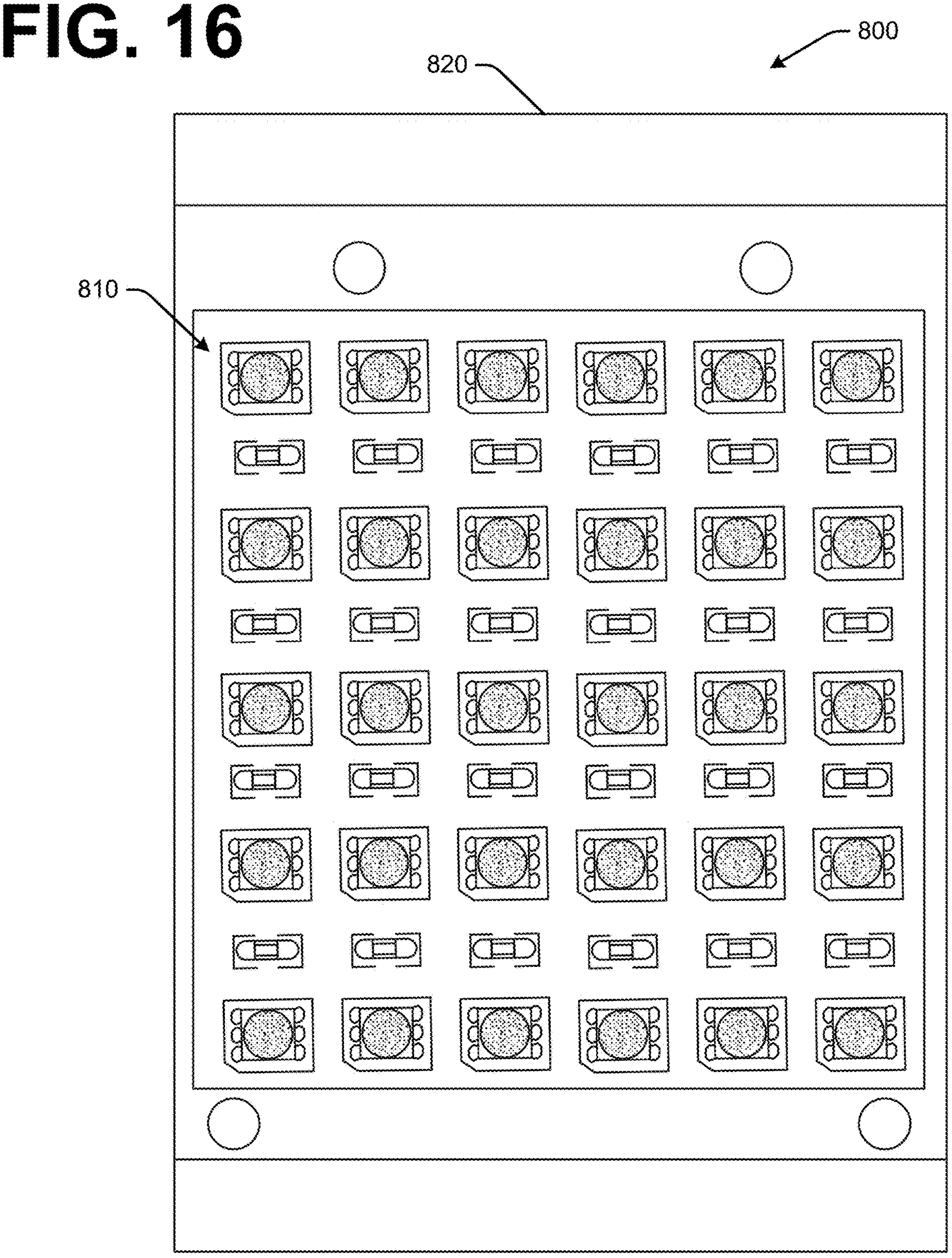
FIG. 16 is a top plan view of another example lighted traffic control device having configurable lights.
Figure 17:
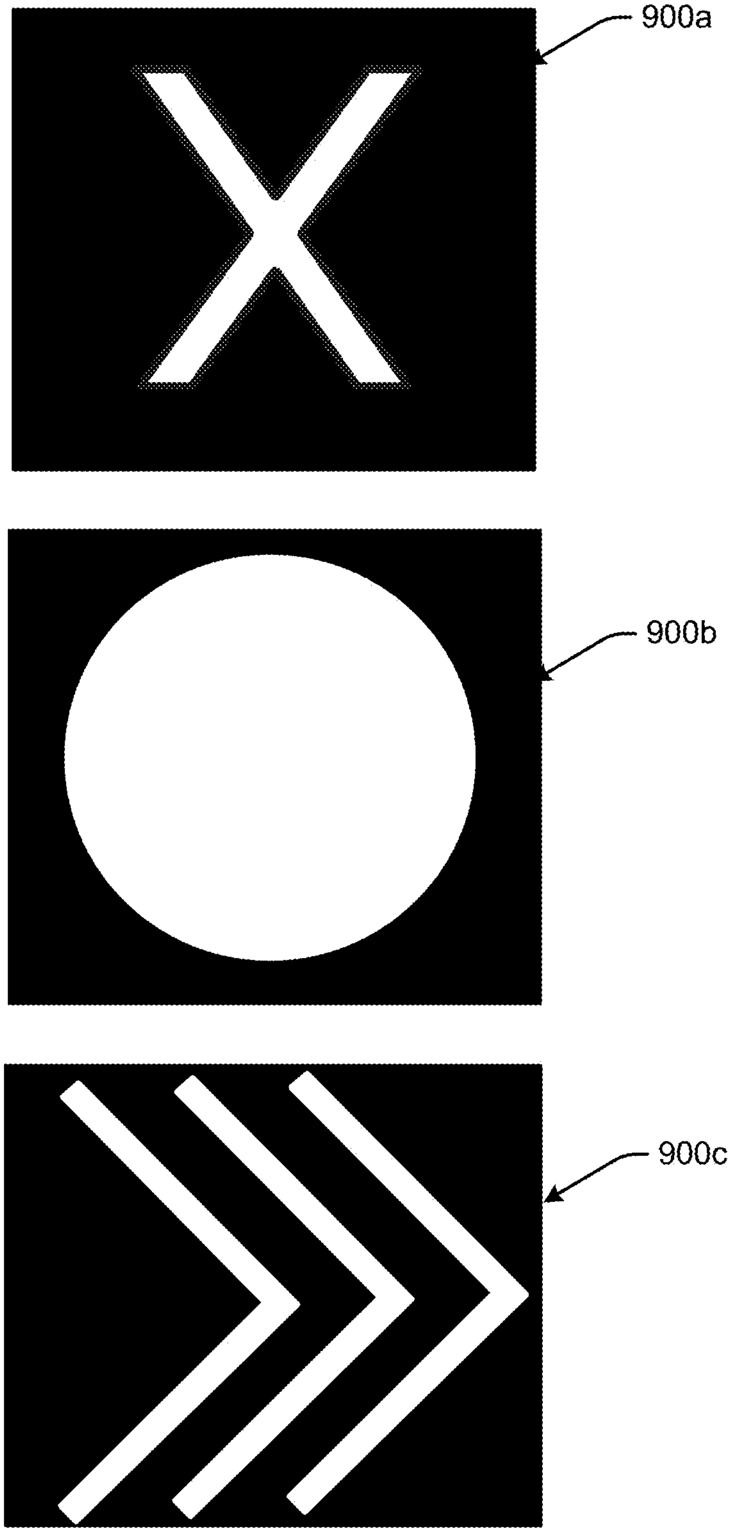
FIG. 17 shows examples of a cover device for configuring the lighted traffic control device shown in FIG. 16.

FIGS. 16 and 17 show another example of a lighted traffic control device having configurable lights (also referred to with reference to these figures as a traffic signaling device). In the embodiment shown in FIGS. 16 and 17, a light pattern is produced by providing a shutter or cover device over the lights. The cover allows some light to pass, while blocking the remainder of the light, thus emitting a light pattern, such as a lighted X, circle or O, or one or more arrows for traffic control. Of course, other light patterns may also be emitted, based on the configuration of the cover.

FIG. 16 is a top plan view of the example lighted traffic control device having configurable lights. The lighted traffic control device 800 has a light panel 810 provided in or otherwise as part of or with a housing or base structure 820. The lights may be provided as one or more arrays and/or as a panel of LED lights. The lights are covered by a cover device for configuring output of a light pattern. The lighted traffic control device is thus a robust traffic signaling device engineered to address the critical need for clear, reliable communication at roadwork sites. The lighted traffic control device 800 is highly adaptable to different traffic scenarios (e.g., those described herein, and others), and can be configured and reconfigured on the job without the need for sophisticated programming or use of specialized tools or equipment.

FIG. 17 shows examples of a cover device (e.g., embodiments 900*a-c*) for configuring output of a light pattern. When implemented in conjunction with the base structure 820 of the lighted traffic control device 800 shown in FIG. 16, the cover device 900*a-c* controls the light that is emitted or passes therethrough to form a lighted pattern. The covers 900*a-c* each have predetermined shutter patterns configured to selectively block and allow passage of light emitted by the light panel to form visible lighted signal shapes. As such, the cover is modular and interchangeable to display different signal patterns using the same light panel. The modular and interchangeable nature of the cover (e.g., changing between embodiments 900*a*, 900*b*, 900*c* and/or other embodiments) makes it adaptable to various use cases in a variety of different traffic management environments.

In an example, the base 820 has a recessed portion (see by way of illustration, the embodiment shown in FIG. 9) for protecting the light panel 810 therein. In another example, the base 820 includes one or more interior compartments for mounting the light panel 810 and associated control electronics. The base 820 can also include at least one ramp 820 along one or more edges of the base 820 to provide smooth traversal by vehicle tires.

In an example, the base 820 houses a grid or panel of high-efficiency LED arrays with modular shutters or covers 900*a-c* that feature defined shutter patterns. These patterns are designed to selectively block some light, while allowing at least some light to pass, forming well-defined shapes such as arrows, X's, or other directional signals as seen by way of illustration in FIG. 17. This helps ensure a high degree of visual clarity and intelligibility for road users under various environmental conditions, including low-light scenarios.

In an example, the cover 900*a-c* includes a substantially opaque material (shown as the black portions in FIG. 17) that does not allow any light to pass through, and a transparent (e.g., clear or open) or partially transparent (e.g., diffused) portion or portions (shown as the white patterns in FIG. 17) to emit light that forms a lighted pattern. In an example, the cover 900*a-c* may include a diffusion panel or diffuser panel that scatters or softens the emitted light, and/or protective cover to help protect the light panel 810. Examples of lighted patterns that may be emitted include, but are not limited to an X, a circle, or one or more arrows. Still other light output patterns are also contemplated, as will be readily understood by those having ordinary skill in the art after becoming familiar with the teachings herein.

In an example, the light panel 810 features redundancy of individual LED lights to help ensure that if one or a few LED lights fail, the remaining LED lights continue to emit sufficient light, thereby maintaining the integrity of the displayed pattern and avoiding any visually disruptive "dead zones." The configuration can also be optimized for brightness uniformity and even distribution of light across the panel (e.g., with a diffuser panel).

In an example, control electronics for the light panel 810 help to ensure reliable and efficient operation. These electronics can include drivers that regulate the electrical current supplied to the LEDs, protecting them from power fluctuations that could shorten their lifespan or affect performance. Pulse-width modulation (PWM) circuits may be employed to adjust the brightness of the LED lights dynamically, enabling the light panel to adapt to changing ambient light conditions for optimal visibility. Additionally, the control electronics can include circuitry for fault detection and diagnostics, allowing operators to identify and address issues such as LED light failures or power disruptions.

For advanced implementations, microcontrollers or programmable logic controllers (PLCs) can be integrated into the system to manage the operation of the LED lights. These controllers enable features such as color switching, synchronization with other traffic control devices, and remote control via wired or wireless communication interfaces.

In an example, the base 820 for the LED lights 810 is designed to withstand the rigorous demands of traffic environments. In an example, the base is constructed from thick rubber or other durable materials, the base is engineered to provide exceptional strength and resilience, ensuring it can endure being driven over intentionally or accidentally. The robust construction not only protects the LED lights 810 but also extends the lifespan of the entire system, making it suitable for heavy-duty use at roadwork sites.

To safeguard the LED lights 810 from damage, the base 820 can incorporate a recessed design where the lights are positioned below the surface level. This recessed setup minimizes direct exposure to external forces, providing protection against impact from tires or debris. Additionally, ramps around the edges of the base 820 help provide smooth transitions for vehicle tires, reducing the risk of abrupt impacts, reducing movement of the base when contacted by a tire, and promoting seamless passage over the device. The ramps are particularly important in maintaining traffic flow and preventing damage to the base itself during repetitive use.

In an example, the base 820 has an interior portion dedicated to housing the LED lights 810 and their associated control electronics. This compartmentalized structure secures all critical components, protecting them from environmental stressors such as moisture, dust, and temperature extremes. The integrated design simplifies assembly and maintenance, allowing for efficient installation and servicing in the field. Overall, the base 820 combines durability, functionality, and practical engineering to support the LED signaling system in demanding traffic management scenarios.

The shutters or covers 900*a-c* may be provided separate from the base 820 housing the LED lights 810, and is designed to be interchangeably placed over the housing 820, similar to using a blanket. These interchangeable covers 900*a-c* enable quick modifications to the display configuration without altering the physical layout or programming of the LED panel 810 itself. By manually switching out the covers 900*a-c*, operators can quickly and efficiently create different signal patterns tailored to the requirements of specific traffic scenarios. This modular approach enhances the adaptability of the device 800, allowing a single LED panel 810 to serve multiple signaling purposes with minimal downtime.

In an example, the covers 900*a-c* are manufactured with durable, weather-resistant materials (e.g., plastic sheets or rubber mats) and incorporate predetermined cutouts that align with the display requirements for traffic control. The interaction between the LED light source 810 and the patterned covers 900*a-c* minimizes optical distortion, resulting in uniformly sharp and precise signal outputs. In an example, "blank" covers can be provided so that custom patterns can be cut out by the end user. The design of the covers 900*a-c* maximize functionality, adaptability, and ease of use.

Figure 18:
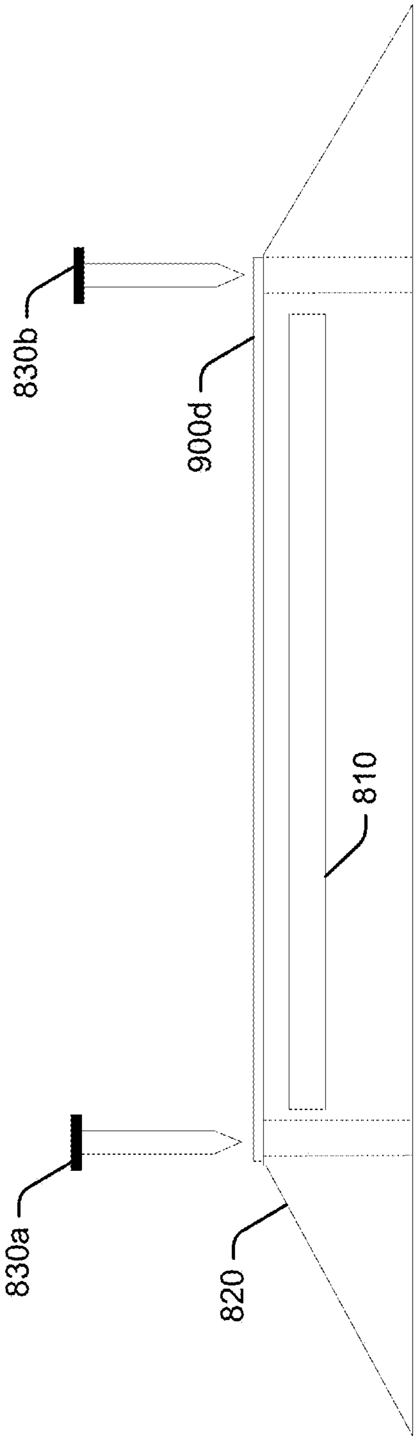
FIGS. 18-20 show other examples of a cover device of the lighted traffic control device.

In the example illustrated in FIG. 18, a cover 900*d* is formed as a sheet or mat that is configured to be placed or laid over the light panel 810. In an example, the cover 900*d* is a heavy rubber mat that remains in place under its own weight. This design is particularly convenient for quick deployment and pattern changes. In another example, the cover 900*d* can be temporarily connected to the base 820 by fastening mechanisms 830*a*, 830*b*, such as pins, stakes, tabs, screws, hook-and-loop fasteners, and/or other fastening mechanisms. The fastening mechanisms can be the same mechanisms provided to secure the base 820 to the ground, or provided separately to connect only the cover 900*d* to the base 820. These fasteners offer flexibility in securing the cover 900*d* while allowing them to be detached and replaced as needed.

Figure 19:
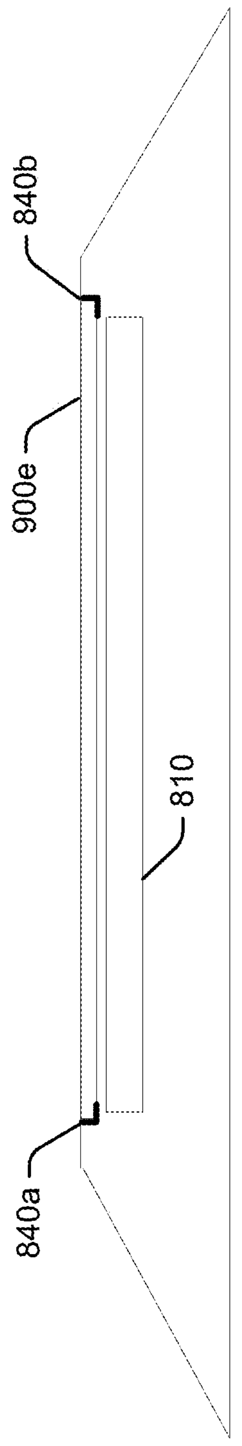

In another example as illustrated in FIG. 19, a cover 900*e* is formed as a board that fits onto ledges 830*a*, 830*b* or into a channel (not shown) of the base for secure placement over the light panel 810. For example, the cover 900*e* may be a plexiglass or similar board that can be readily interchanged with other covers 900*e* to provide different lighted patterns for various traffic control scenarios. This approach provides added stability, ensuring the covers remain firmly positioned even in conditions involving vibrations or strong wind.

Figure 20:
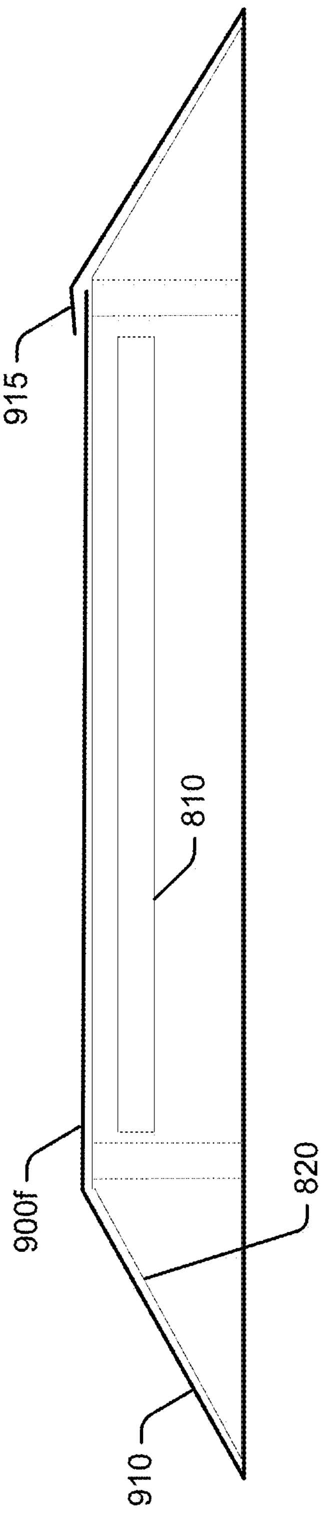

In another example as illustrated in FIG. 20, a cover 900*f* is provided on a side of a body 910 of a bag or other container. For example, the cover 900*f* may be provided in a soft-sided bag. In another example, the cover 900*f* may be provided on the side of a hard-sided container. The base 820 with light panel 810 can be inserted into the bag or container, thereby enclosing the base 820 therein with the light panel 810 adjacent to the cover 900*f*. The base 820 can be swapped to another bag or container (e.g., having a cover 900*f* with a different pattern) to change the light pattern that is emitted.

In an example, the body 910 of the bag or container can be open on one end to facilitate quick insertion and removal of the base therein. In another example, the base may be closed therein with a closure mechanism 915, such as a flap or a door, e.g., to reduce contact of the base 820 with dirt, debris and/or water.

This design eliminates the need for direct anchoring to the housing, as the base 820 housing the LED lights 810 is provided within the cover 900*f*. The container-like cover 900*f* can be manufactured using thick fabric, polymer sheets, or other robust materials that offer protection against environmental factors and physical wear.

Other example configurations include magnetically attachable covers (not shown) for metallic LED housings, providing an effortless yet reliable connection. Hinged or sliding panel covers (not shown) can also be provided, enabling the covers to be moved into position without complete detachment. Furthermore, for high-precision applications, the shutter patterns can be implemented using rigid frames (not shown) fitted with replaceable panels, ensuring consistent pattern alignment with minimal distortion. Each design variation emphasizes modularity and ease of adaptation to suit diverse traffic management requirements.

The system is engineered with both functional reliability and ease of deployment in mind. Its mechanical and electrical components are designed to meet the rigorous demands of roadwork environments, including exposure to vibrations, dust, and temperature variations. By combining optical engineering with modular design principles, the lighted traffic control device having configurable lights provides a scalable and adaptable solution for enhancing traffic management and safety at construction and maintenance sites.

Figure 21:
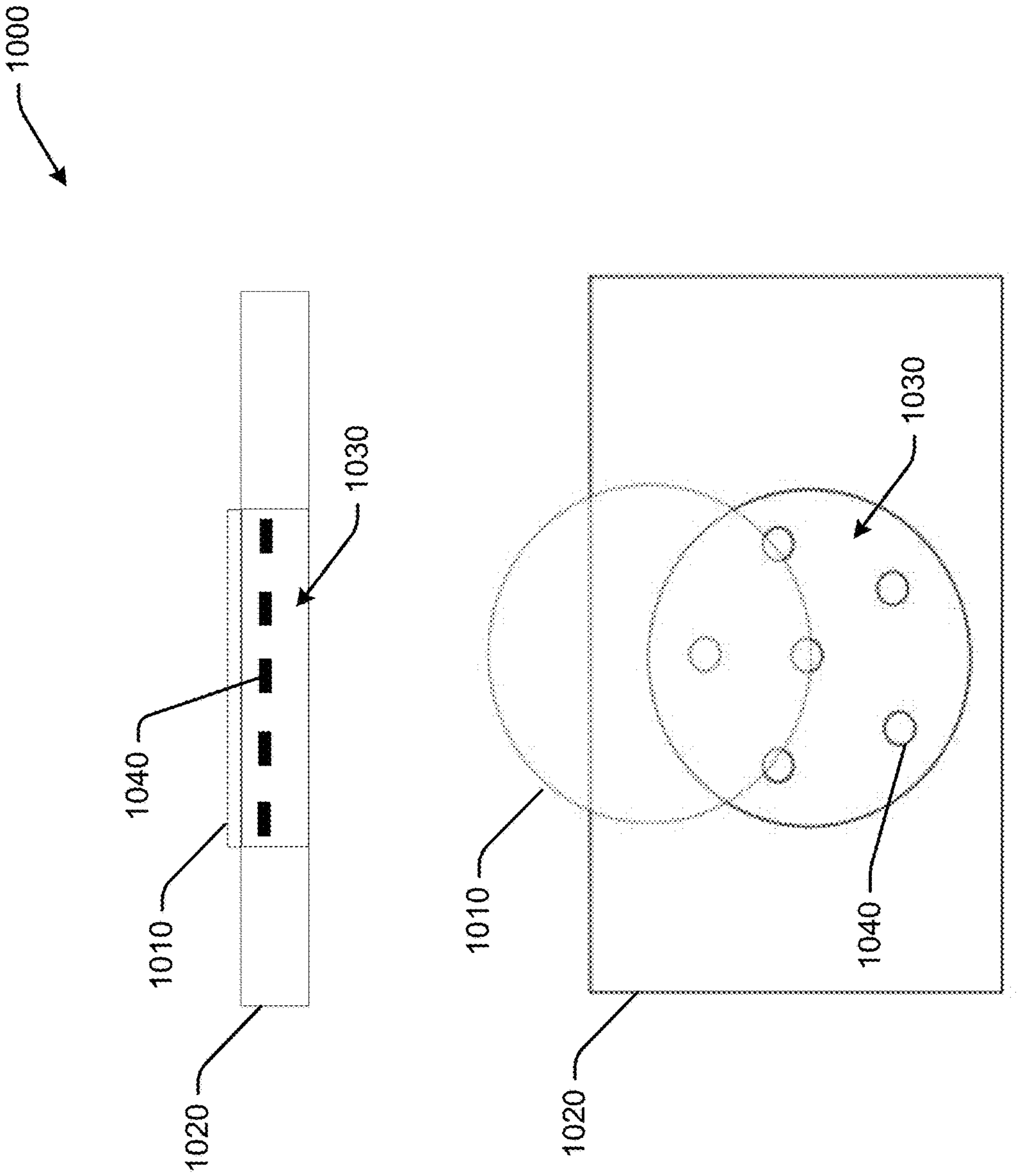
FIG. 21 shows another example of a lighted traffic control device with a circular diffusion cover device.
Figure 22:
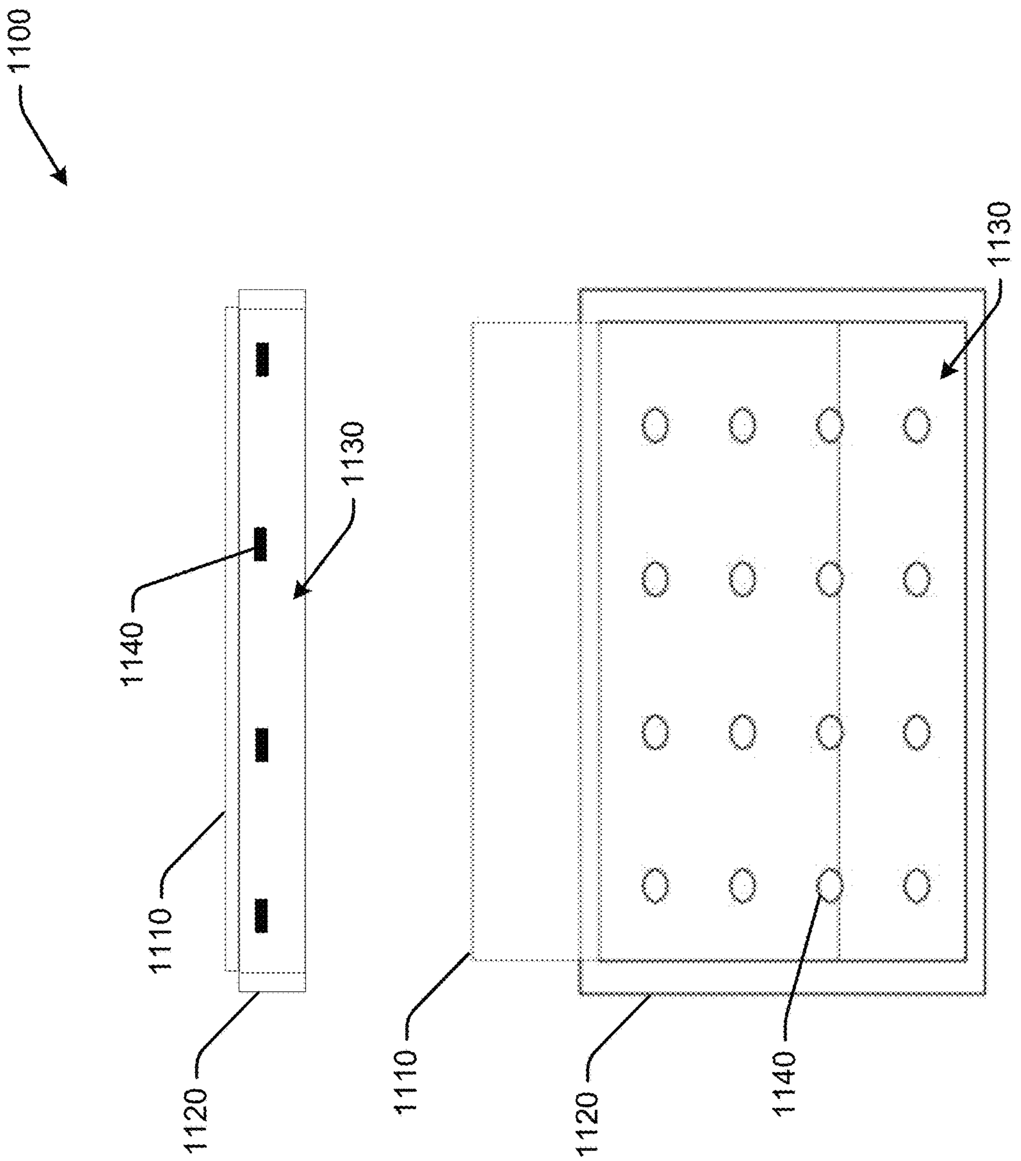
FIG. 22 shows another example of a lighted traffic control device with a square or rectangular diffusion cover device.
Figure 23:
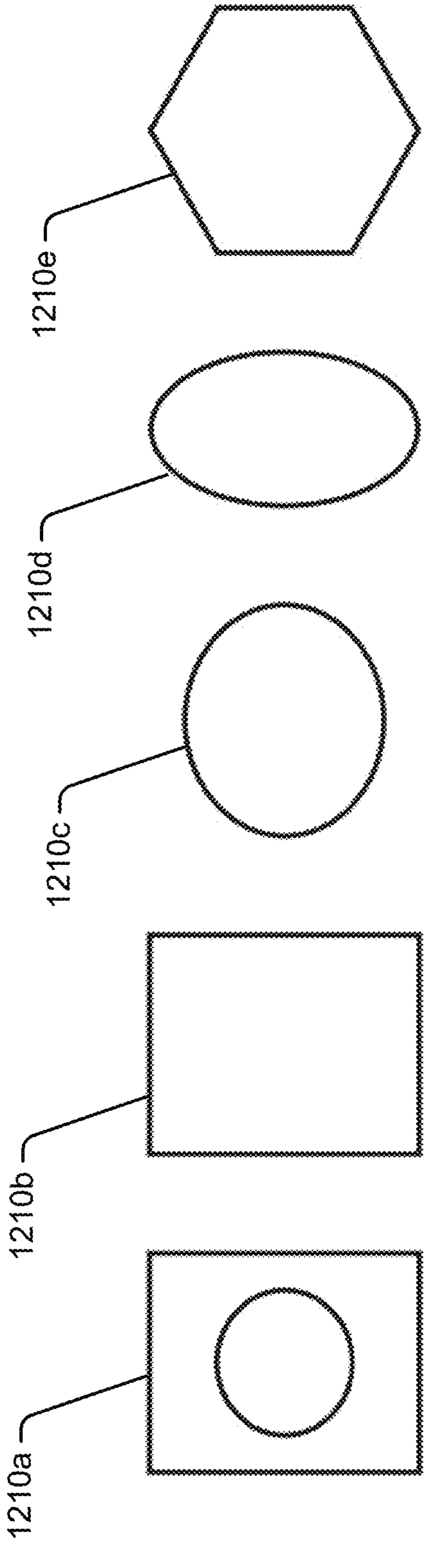
FIG. 23 shows other example shapes for diffusion cover devices.

FIG. 21 shows both a side cross-sectional view (top) and plan view (bottom) of another example of a lighted traffic control device 1000 with a circular diffusion cover device 1010. The lighted traffic control device 1000 has a base 1020 with an interior chamber 1030 housing a plurality of LED elements 1040. FIG. 22 shows both a side cross-sectional view (top) and plan view (bottom) another example of a lighted traffic control device 1100 with a square or rectangular diffusion cover device 1110. The lighted traffic control device 1000 also has a base 1120 with an interior chamber 1130 housing a plurality of LED elements 1140. FIG. 23 shows other example shapes for diffusion cover devices 1210*a-e*.

The lighted traffic control device 1000 and 1100 is designed to enhance visibility and create a cohesive light output that is visually distinct and uniform. Its base structure 1020 and 1120 provides a sturdy foundation and houses an interior chamber 1030 and 1130 that securely holds LED elements 1040 and 1140, e.g., configured as an LED light panel positioned to emit light upward from the base structure 1020 and 1120. A thin acrylic diffusion panel or diffuser panel 1010 and 1110 is mounted over the LED light panel. This diffuser panel 1010 and 1110 softens the emitted light by scattering and blending the beams from individual LED elements 1040 and 1140. As a result, the device produces a singular, unified light output that eliminates the perception of multiple discrete LED elements.

In an example, the base structure 1020 and 1120 is a durable rubber mat, designed to withstand significant mechanical stress, such as the weight and force exerted by vehicular traffic. Its robustness ensures that it can endure repeated loads without compromising the integrity of the internal components housed within it. The mat has a hollow interior chamber 1030 and 1130 to house the LED elements 1040 and 1140. This chamber 1030 and 1130 is protected by the resilient properties of the rubber material, preventing any deformation or crushing of the LED elements even under substantial pressure.

In an example, the interior chamber 1030 and 1130 may be constructed as a series of one or more interconnected channels embedded within the rubber mat. These channels are arranged to collectively form the LED "panel." This channel system further provides structural stability, making the base structure 1020 and 1120 highly suitable for traffic control applications in demanding environments.

In an example, the base 1020 and 1120 is constructed from a durable rubber material designed to provide flexibility and impact resistance. The rubber base 1020 and 1120 can be further reinforced with aluminum or other suitable structural supports embedded within its design to enhance its strength and rigidity. These structural supports can form the framework for the interior chamber 1030 and 1130 and/or channel structure described above. These supports distribute any applied loads evenly across the structure, preventing localized stress that could damage the LED elements housed within. This hybrid construction leverages the shock-absorbing properties of the rubber material alongside the structural integrity provided by the metal supports, resulting in a robust and reliable base capable of protecting internal components while withstanding rigorous operational demands.

The interior chamber 1030 and 1130 which houses the LED elements 1040 and 1140 can be designed in various geometric configurations when viewed from above. Examples of suitable shapes for this chamber 1030 and 1130 include circles or squares. A circular chamber 1030 as shown in FIG. 21, offers a symmetrical design, allowing for even light dispersion in all directions, which can be advantageous for applications requiring uniform illumination. A square chamber 1130 as shown in FIG. 22, provides a more angular and structured layout, which might be suited for specific directional light distribution or to meet other requirements.

However, the chamber shape 1030 and 1130 is not limited to these configurations. Other geometries, such as rectangles, hexagons, or custom irregular shapes, can also be utilized for specific design and/or functional needs.

It is noted that the circular configuration of the interior chamber 1030 shown in FIG. 21 offers efficiency advantages due to its compact and uniform design. By forming a round chamber 1030, fewer LED elements 1040 are required to achieve the desired light intensity and coverage, as the layout naturally focuses light emission within a centralized area. This reduction in the number of LED elements 1040 directly translates to lower power consumption, making the circular configuration more energy-efficient compared to a square chamber that might require additional LED elements 1040 to fill its angular corners and maintain even illumination.

Moreover, the circular design 1030 shown in FIG. 21 allows for more material in the surrounding rubber mat 1020 for reinforcement and structural support. This increased support enhances the ability of the base structure 1020 to distribute loads and absorb impacts, which helps prevent stress on the LED elements 1040 housed within the chamber 1030. Consequently, the durability of the device is improved, as the LED elements 1040 are less likely to be damaged under high pressure or repeated use. The combination of fewer LED elements 1040, lower energy requirements, and enhanced physical protection makes the circular configuration particularly suitable for applications that demand long-term reliability and efficiency.

The mat 1020 itself may also be various shapes, e.g., as illustrated in FIG. 23. For example, the shape of the base 1020 may be selected based on the desired light pattern, spatial constraints, or other considerations of the traffic control device 1000 and 1100.

By way of example, an oval-shaped mat, when viewed from a vehicle approaching at higher speeds, may visually resemble a circular mat due to its elongated geometry and the motion blur effect. This feature makes oval configurations suitable for applications requiring a balance between expansive coverage and efficient design. These alternative base shapes also enhance the flexibility of the traffic control device's deployment, enabling it to adapt to varied spatial or operational constraints while maintaining structural integrity and functionality.

In an example, control electronics are provided in the base 1020 and 1120, e.g., in the chamber 1030 and 1130 and/or other chamber(s) in the base 1020 and 1120. The control electronics enable advanced functionality. These controllers can modulate the LED elements 1040 and 1140 to provide various output modes, including flashing patterns for signaling, sequencing for dynamic light effects, steady illumination for continuous visibility, and the ability to emit light in multiple colors for varied applications. Remote control capability is also incorporated, enabling users to adjust settings and operational modes wirelessly. This feature allows for convenient management of the LED elements 1040 and 1140, enhancing the versatility and usability of the traffic control device across diverse environments and operational scenarios.

In an example, power options, such as solar panels and rechargeable batteries, may also be provided in the base structure 1020 and 1120. These power options may allow for autonomous operation without reliance on external power sources. This makes the device adaptable for use in remote or temporary locations.

The diffusion cover 1010 and 1110 of the lighted traffic control device 1000 and 1100 is provided to optimize light output and uniformity. In an example, the 1010 and 1110 is constructed from acrylic to diffuse the emitted light effectively, blending the individual beams from multiple LED elements 1040 and 1140 into a cohesive and smooth light source. Its primary function is to ensure that the light appears as a singular, solid output, eliminating the visual distinction of discrete LED elements 1040 and 1140.

The diffusion cover 1010 and 1110 can be manufactured in various shapes to influence the direction and pattern of the light output. Examples include circular, square, or arrow-shaped designs, tailored to specific signaling requirements. Additionally, the diffusion cover 1010 and 1110 can be fabricated in different colors to alter the perceived light color, enabling applications where only white LEDs are used. By filtering the white light through a colored diffusion cover 1010 and 1110, the device can achieve a spectrum of colored outputs for diverse traffic control scenarios. The combination of shape and color customization makes the diffusion cover 1010 and 1110 adaptable to various functional and aesthetic needs, while maintaining its core purpose of delivering smooth and uniform light dispersion.

It is noted that the examples shown and described are provided for purposes of illustration and are not intended to be limiting. Still other examples are also contemplated.

The invention claimed is:

1. A traffic signaling device, comprising:

a light panel with a plurality of LED lights arranged to emit light;

a base for housing the light panel; and a diffuser cover for the base, the diffuser cover having a predetermined shutter pattern configured to selectively block and allow passage of light emitted by the light panel to form visible lighted signal shapes, wherein the diffuser cover is modular and interchangeable to display different signal patterns using the same light panel;

wherein the diffuser cover is a soft-sided bag at least partially enclosing the base and the light panel therein.

2. The traffic signaling device of claim 1, wherein the base has a recessed portion for protecting the light panel.

3. The traffic signaling device of claim 1, wherein the base has at least one ramp along one or more edges of the base for smooth traversal by vehicle tires.

4. The traffic signaling device of claim 1, wherein the soft-sided bag comprises a thick rubber sheet configured to remain in place under its own weight.

5. The traffic signaling device of claim 1, wherein the diffuser cover is formed to fit into ledges integrated into the base for secure placement over the light panel.

6. The traffic signaling device of claim 1, wherein the diffuser cover is temporarily connected to the base by at least one of tabs, pins, screws, or hook-and-loop fasteners.

7. The traffic signaling device of claim 1, wherein the base is constructed from thick rubber or other durable materials suitable for use in vehicular traffic areas.

8. The traffic signaling device of claim 1, wherein the base has an interior compartment for mounting the light panel and associated control electronics.

9. The traffic signaling device of claim 1, wherein the light panel has a plurality of LED lights arranged such that if one or more of the plurality of LED lights fail, sufficient light is still emitted to maintain the visible signal shape.

10. The traffic signaling device of claim 1, wherein control electronics for the LED lights include circuits for brightness adjustment.

11. A traffic signaling device with manually configurable light patterns, comprising:

a light panel with a plurality of LED lights arranged to emit light;

a base for housing the light panel;

a first interchangeable diffuser cover having a first predetermined shutter pattern configured to selectively block and allow passage of light emitted by the light panel to form a first visible lighted signal shape when the first interchangeable diffuser cover is positioned over the light panel in the base; and a second interchangeable diffuser cover having a second predetermined shutter pattern configured to selectively block and allow passage of light emitted by the light panel to form a second visible lighted signal shape when the second interchangeable diffuser cover is positioned over the light panel in the base;

wherein the first and second interchangeable diffuser covers display different signal patterns using the same light panel; and wherein the first and second interchangeable diffuser covers are part of separate containers at least partially enclosing the base therein.

12. The traffic signaling device of claim 11, wherein the base has a recessed portion for protecting the light panel.

13. The traffic signaling device of claim 11, wherein the base has at least one ramp along one or more edges of the base for smooth traversal by vehicle tires.

14. The traffic signaling device of claim 11, wherein the first and second interchangeable diffuser covers comprise thick rubber sheets configured to remain in place under their own weight.

15. The traffic signaling device of claim 11, wherein the first and second interchangeable diffuser covers fit into ledges integrated into the base for secure placement over the light panel.

16. A traffic signaling device, comprising:

a light panel with a plurality of LED lights arranged to emit light;

a base for housing the light panel; and a diffuser cover for the base, the diffuser cover having a predetermined shutter pattern configured to selectively block and allow passage of light emitted by the light panel to form visible lighted signal shapes, wherein the diffuser cover is modular and interchangeable to display different signal patterns using the same light panel;

wherein the diffuser cover is a hard-sided container at least partially enclosing the base and the light panel therein.

* * * * *